(12) United States Patent
Yokoyama

(10) Patent No.: US 7,859,767 B2
(45) Date of Patent: Dec. 28, 2010

(54) ZOOM LENS AND IMAGING DEVICE HAVING THE SAME

(75) Inventor: Takayoshi Yokoyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/372,241

(22) Filed: Feb. 17, 2009

(65) Prior Publication Data

US 2009/0207501 A1    Aug. 20, 2009

(30) Foreign Application Priority Data

Feb. 19, 2008    (JP)    ................. 2008-037133

(51) Int. Cl.
  *G02B 15/14*    (2006.01)
  *G02B 15/22*    (2006.01)
(52) U.S. Cl. .................. 359/689; 359/683; 359/684; 359/685; 359/686; 359/693
(58) Field of Classification Search .............. 359/684, 359/683–690, 693, 676
  See application file for complete search history.

(56) References Cited

U.S. PATENT DOCUMENTS 5,701,204 A   12/1997   Matsumoto ................. 359/684

2007/0195425 A1 *   8/2007   Arai ........................... 359/687

FOREIGN PATENT DOCUMENTS

| JP | 4-127111 | 4/1992 |
|----|----------|--------|
| JP | 7-140389 | 6/1995 |
| JP | 11-258506 | 9/1999 |

* cited by examiner

*Primary Examiner*—Scott J Sugarman
*Assistant Examiner*—Zachary Wilkes
(74) *Attorney, Agent, or Firm*—Fitzpatrick, Cella, Harper & Scinto

(57) ABSTRACT

A zoom lens including, in an order from an object side to an image side, a first lens group having a positive refracting power, a second lens group having a negative refracting power, and a rear group including at least one lens group, the zooming operation being performed by changing a spacing of the lens groups, wherein the zoom lens has an aperture stop and, when the second lens group is taken as a first focus group and a sub-lens group constituting a portion of one lens group of the rear group is taken as a second focus group, the lens structure and the movement amount of the first and second focus groups are set appropriately.

9 Claims, 17 Drawing Sheets

ZOOM LENS AND IMAGING DEVICE HAVING THE SAME

FIELD OF THE INVENTION AND RELATED ART

This invention relates to a zoom lens suitable for a still camera, a television camera, a video camera, a photographic camera, and a digital camera, for example. More particularly, the invention concerns a zoom lens by which satisfactory aberration correction can be made over the whole object distance from infinity to the shortest photographic distance.

Conventionally, there is a floating focus in which a plurality of lens groups are moved in an optical axis direction, for focusing the zoom lens.

With such floating focus, the movement amount (stroke) of the focus lens group can be shortened, and reduction in size of the whole lens system can be attempted. Moreover the aberration change can be reduced.

U.S. Pat. No. 5,701,204 discloses a zoom lens which comprises, in an order from the object side to the image side, a first lens group having a positive refracting power, a second lens group having a negative refracting power, and a final lens group comprised of a lens group having a negative refracting power. In this zoom lens, the focusing is performed by moving the first lens group and the final lens group in the optical axis direction.

Japanese Laid-Open Patent Application No. 11-258506 discloses a zoom lens which comprises, in an order from the object side to the image side, a first lens group having a positive refracting power, a second lens group having a negative refracting power, a third lens group having a positive refracting power, a fourth lens group having a negative refracting power, and a fifth lens group having a positive refracting power. In this zoom lens, the focusing is performed by moving the first lens group and the second lens group along the optical axis.

Japanese Laid-Open Patent Application No. 04-127111 discloses a zoom lens which comprises, in an order from the object side to the image side, a first lens group having a positive refracting power, a second lens group having a negative refracting power, a third lens group having a positive refracting power, and a fourth lens group having a positive refracting power. In this zoom lens, the focusing is carried out by moving a portion of the first lens group and the fourth lens group, or all of them, in the optical axis direction.

Japanese Laid-Open Patent Application No. 07-140389 discloses a zoom lens in which a lens group having a positive refracting power is disposed closest to the object side, while a lens group located closest to the image side is provided by two lens groups. In this zoom lens, the focusing is carried out by moving one lens group of the two lens groups closest to the image side as well as the lens group closest to the object side, in the optical axis direction.

In general, when a plurality of lens groups are moved for the focusing, both of the change of chromatic aberration of magnification caused by the focusing and the change of chromatic aberration of magnification caused by the zooming have to be corrected at the same time. For this reason, the degree of freedom for correction of the aberration change is restricted, and it becomes difficult to correct the change of chromatic aberration of magnification during the focusing.

If the focusing is carried out by moving one lens group, among the lens groups constituting the zoom lens, as a first focus group while moving a portion of another lens group as a second focus group, the aberration change can be relatively easily reduced.

Thus, the change of chromatic aberration of magnification during the zooming is corrected by the whole lens group including the second focus group, and only the change of chromatic aberration of magnification during the focusing is corrected by moving the second focus group.

By doing so, the degree of freedom for correction of the aberration change of chromatic aberration of magnification during the zooming and the focusing can be raised, and it becomes easy to obtain better optical performance in which the chromatic aberration of magnification is well corrected throughout the whole object distance.

However, if the movement locus of the first focus group and the second focus group is not set appropriately, it becomes difficult to satisfactorily correct the change of chromatic aberration of magnification caused by the focusing.

Furthermore, if the first focus group is a lens group which is closest to the object sides and the second focus group is a portion of the final lens group, the circumferential light quantity on the image plane decreases greatly during the focusing. This is not convenient since the lens effective diameter has to be made larger if the image plane circumferential light quantity is to be secured.

Because of this, in a zoom lens in which the focusing is carried out by moving one lens group as a first focus group and a portion of another lens group as a second focus group, it is critical to appropriately set the first and second focus groups.

Particularly, if the Abbe number of the material of the positive lens or negative lens constituting the first and second focus groups is inappropriate, the change of chromatic aberration of magnification during the focusing and zooming becomes large, making it difficult to obtain good optical performance.

The present invention provides a zoom lens by which the aberration change during the focusing, particularly the change of chromatic aberration of magnification, can be kept small and by which good optical performance can be assured throughout the whole object distance. The present invention further provides an imaging device having such a zoom lens.

In accordance with an aspect of the present invention, there is provided a zoom lens comprising, in an order from an object side to an image side, a first lens group having a positive refracting power, a second lens group having a negative refracting power, and a rear group including at least one lens group, wherein a zooming operation is performed by changing a spacing of the lens groups, characterized in that: said zoom lens includes an aperture stop and, when said second lens group is taken as a first focus group and a sub-lens group constituting a portion of one lens group of said rear group is taken as a second focus group, each of said first focus group and said second focus group includes a positive lens and a negative lens, and when mean Abbe numbers of materials of the positive lens and the negative lens constituting said first focus group are denoted by Vmp and Vmn, respectively, mean Abbe numbers of materials of the positive lens and the negative lens constituting said second focus group are denoted by Vsp and Vsn, respectively, a difference of a distance from said aperture stop to a surface vertex of said first focus group which is closest to the object side as said zoom lens is focused from an infinity to a shortest photographic distance is denoted by ΔXm, a difference of a distance from said aperture stop to a surface vertex of said second focus group which is closest to the object side as said zoom lens is focused from the infinity to the shortest photographic distance is denoted by ΔXs, a relation $$\Delta Xm*(Vmn-Vmp)*\Delta Xs*(Vsn-Vsp)>0$$

is satisfied.

In the equations and inequations, "*" represents "multiplication sign".

One lens group of said rear group may be a lens group which is located at the object side of a lens group of said rear group which is closest to the image side.

When a focal length of said second focus group is denoted by fs and a focal length of the lens group having said second focus group as it is focused on an object at infinity is denoted by ff, a relation $$0.01<|\mathit{ff/fs}|<0.40$$

may be satisfied.

When said zoom lens is focused from the infinity to the shortest photographic distance only with said first focus group, g=1 is taken where a difference of chromatic aberration of magnification with respect to a g-line is positive while g=−1 is taken where the difference is negative, and when a movement amount of said second focus group as it is focused from the infinity to the shortest photographic distance is denoted by ΔX, a relation $$g*(Vsn-Vsp)*\Delta X>0$$

may be satisfied.

In accordance with another aspect of the present invention, there is provided a zoom lens comprising, in an order from an object side to an image side, a first lens group having a positive refracting power, a second lens group having a negative refracting power, and a rear group including at least one lens group, wherein a zooming operation is performed by changing a spacing of the lens groups, characterized in that: when said second lens group is taken as a first focus group and a sub-lens group constituting a portion of one lens group of said rear group is taken as a second focus group, said second focus group includes at least one positive lens and at least one negative lens, when mean Abbe numbers of materials of the positive lens and the negative lens constituting said second focus group are denoted by Vsp and Vsn, respectively, when said zoom lens is focused from an infinity to a shortest photographic distance only with said first focus group, g=1 is taken where a difference of chromatic aberration of magnification with respect to a g-line is positive while g=−1 is taken where the difference is negative, and when a movement amount of said second focus group as it is focused from the infinity to the shortest photographic distance is denoted by ΔX, a relation $$g*(Vsn-Vsp)*\Delta X>0$$

is satisfied.

One lens group of said rear group may be a lens group which is located at the object side of a lens group of said rear group which is closest to the image side.

When a focal length of said second focus group is denoted by fs and a focal length of the lens group having said second focus group as it is focused on an object at infinity is denoted by ff, a relation $$0.01<|\mathit{ff/fs}|<0.40$$

may be satisfied.

In accordance with a further aspect of the present invention, there is provided an imaging device, comprising: a zoom lens as recited above; and a solid image pickup device configured to receive an image formed by said zoom lens.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of a zoom lens and an imaging device having the same, according to the present invention will now be described with reference to the attached drawings.

A zoom lens of the present invention comprises, in an order from the object side to the image side, a first lens group having a positive refracting power, a second lens group having a negative refracting power, and a rear group including one or more lens groups. In order to perform the zooming, the spacings of these lens groups are changed. While taking the second lens group as a first focus group and taking a sub-lens group constituting a portion of one lens group of the rear group as a second focus group, the focusing is carried out by moving the first focus group and the second focus group.

Figure 1:
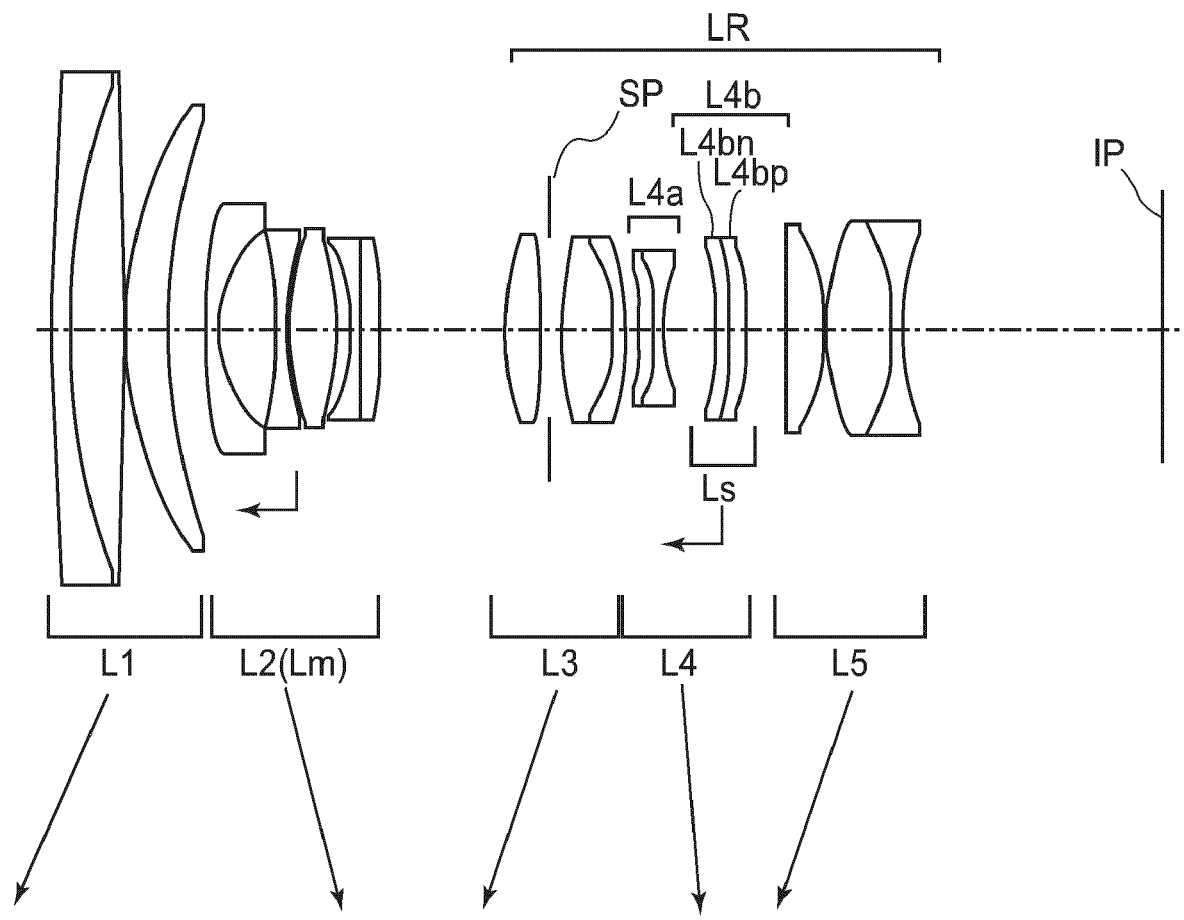
FIG. 1 is a sectional view of a zoom lens according to a first embodiment of the present invention.

FIG. 1 is a lens sectional view of the zoom lens according to a first embodiment of the present invention, at a wide-angle end (short focal distance end) thereof.

FIGS. 2A-2C, FIGS. 3A-3C and FIGS. 4A-4C are aberration diagrams, respectively, when the lens of the first embodiment of the present invention is focused on an object at infinity, when it is focused on an object at a shortest photographic distance 0.5 m (photographic magnification β=0.15), and when only by the first focus group it is focused on an object at a distance 0.5 m, respectively.

Figure 5:
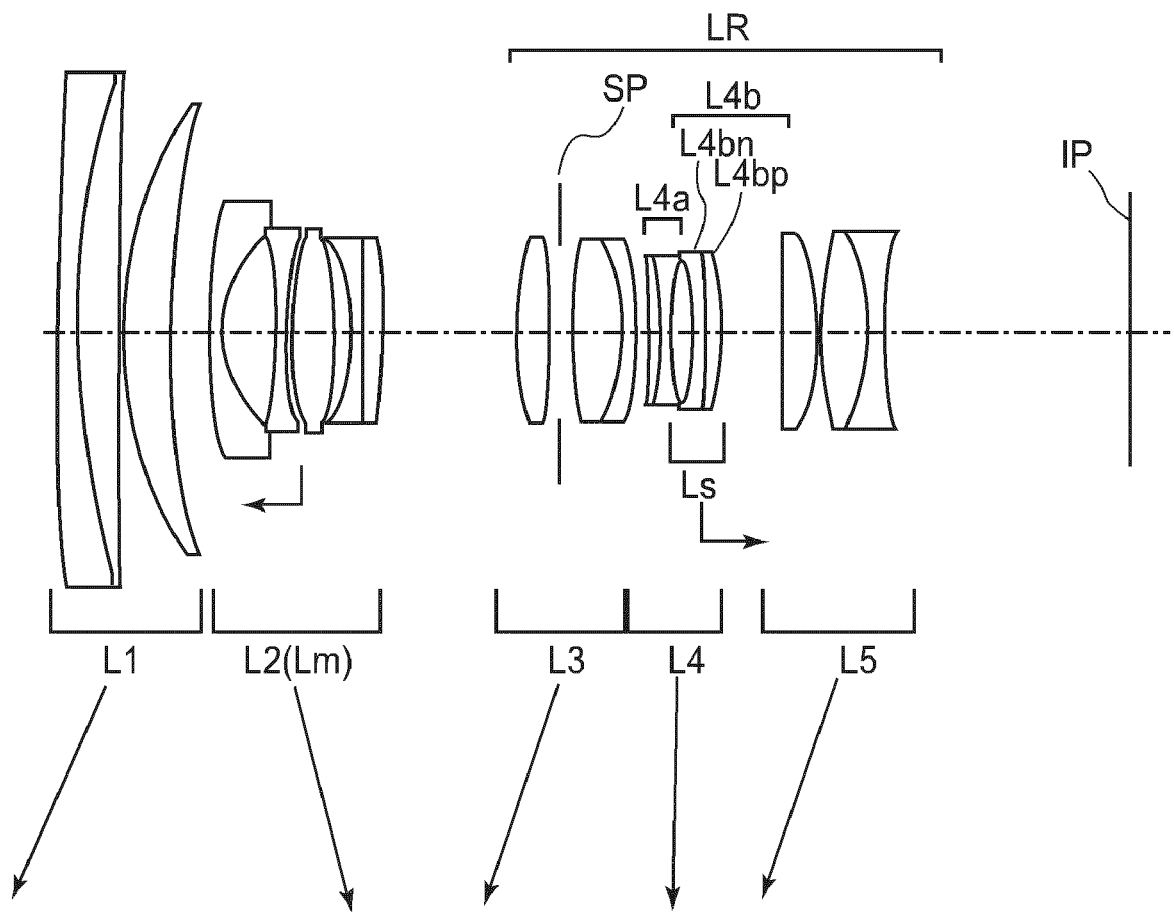
FIG. 5 is a sectional view of a zoom lens according to a second embodiment of the present invention.

FIG. 5 is a lens sectional view of the zoom lens according to a second embodiment of the present invention, at a wide-angle end thereof.

FIGS. 6A-6C, FIGS. 7A-7C and FIGS. 8A-8C are aberration diagrams, respectively, when the lens of the second embodiment of the present invention is focused on an object at infinity, when it is focused on an object at a shortest photographic distance 0.5 m (photographic magnification β=0.15), and when only by the first focus group it is focused on an object at a distance 0.5 m, respectively.

Figure 9:
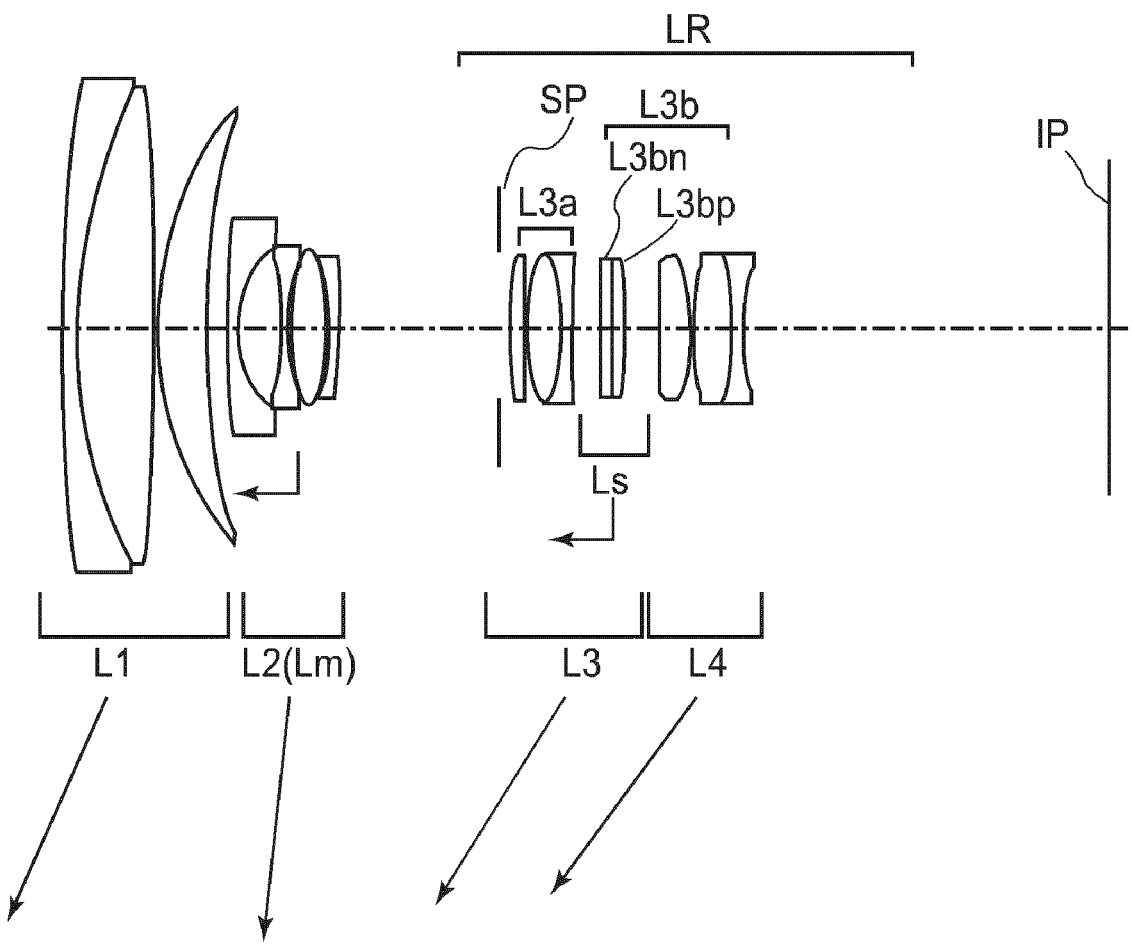
FIG. 9 is a sectional view of a zoom lens according to a third embodiment of the present invention.

FIG. 9 is a lens sectional view of the zoom lens according to a third embodiment of the present invention, at a wide-angle end thereof.

FIGS. 10A-10C, FIGS. 11A-11C and FIGS. 12A-12C are aberration diagrams, respectively, when the lens of the third embodiment of the present invention is focused on an object at infinity, when it is focused on an object at a shortest photographic distance 0.5 m (photographic magnification β=0.19), and when only by the first focus group it is focused on an object at a distance 0.5 m, respectively.

Figure 13:
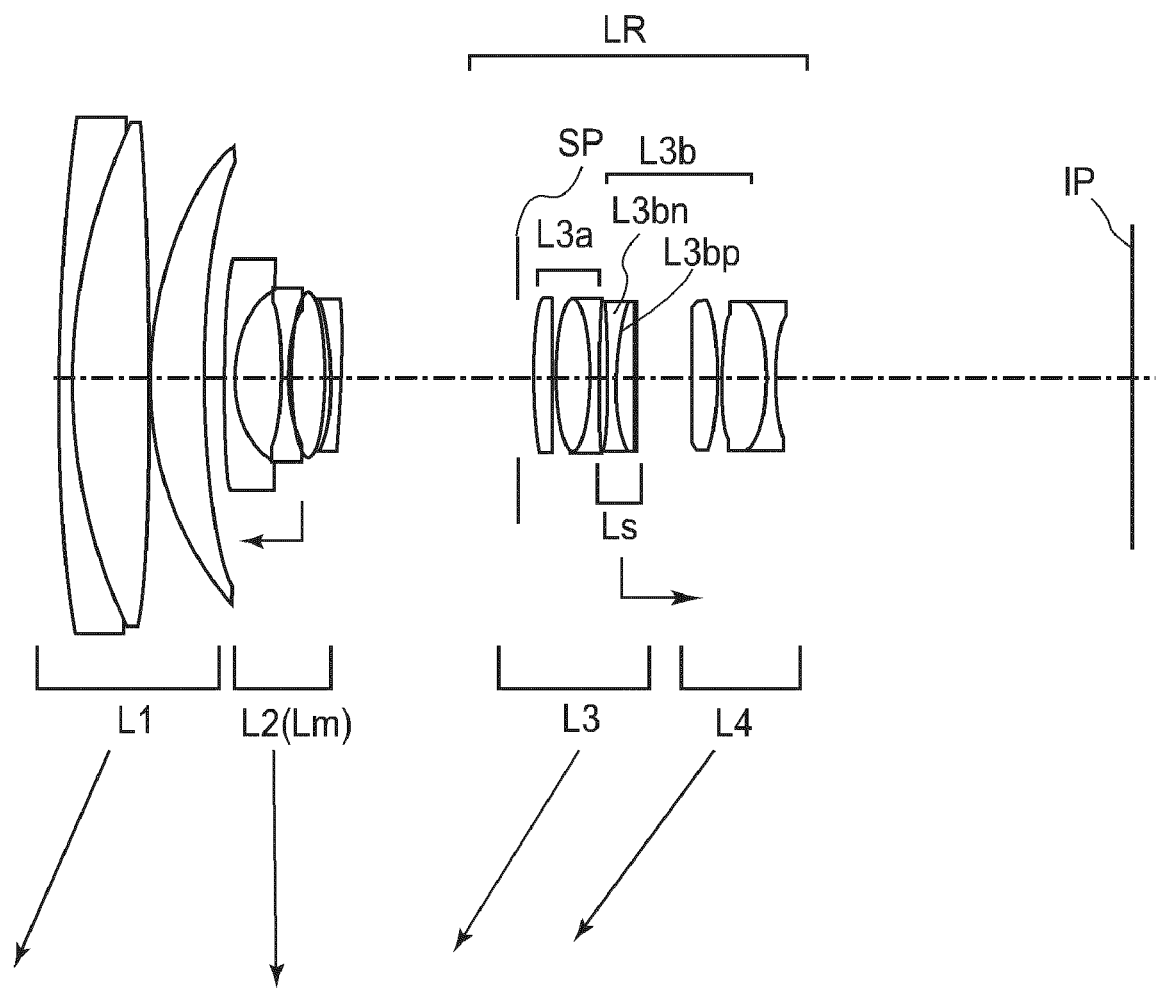
FIG. 13 is a sectional view of a zoom lens according to a fourth embodiment of the present invention.

FIG. 13 is a lens sectional view of the zoom lens according to a fourth embodiment of the present invention, at a wide-angle thereof.

FIGS. 14A-14C, FIGS. 15A-15C and FIGS. 16A-16C are aberration diagrams, respectively, when the lens of the fourth embodiment of the present invention is focused on an object at infinity, when it is focused on an object at a shortest photographic distance 0.5 m (photographic magnification β=0.20), and when only by the first focus group it is focused on an object at a distance 0.5 m, respectively.

Figure 2A:
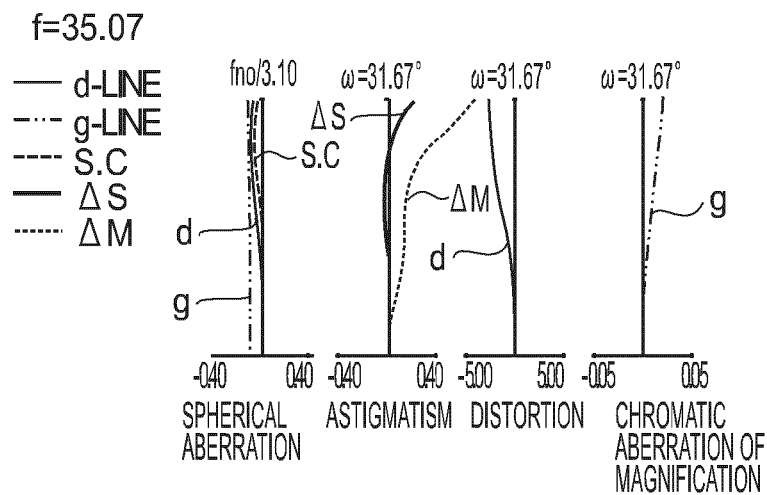
FIGS. 2A, 2B and 2C are aberration diagrams at a wide-angle end, an intermediate focal length and a telephoto end, respectively, when the lens of the first embodiment of the present invention is focused on an object at infinity.
Figure 2B:
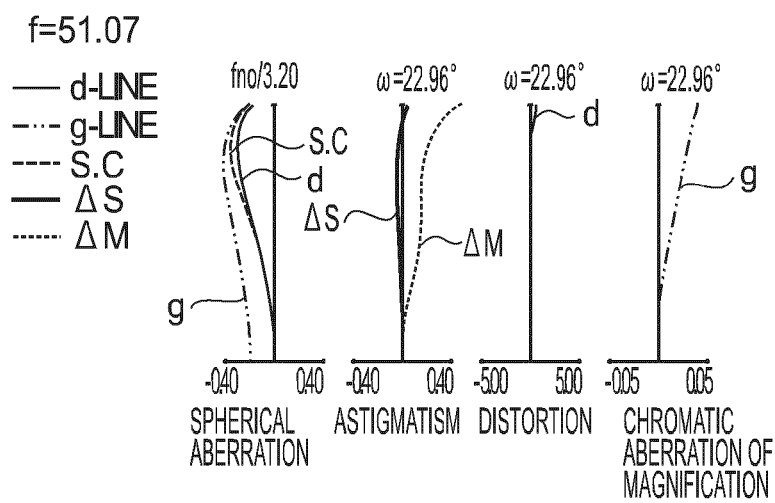
Figure 2C:
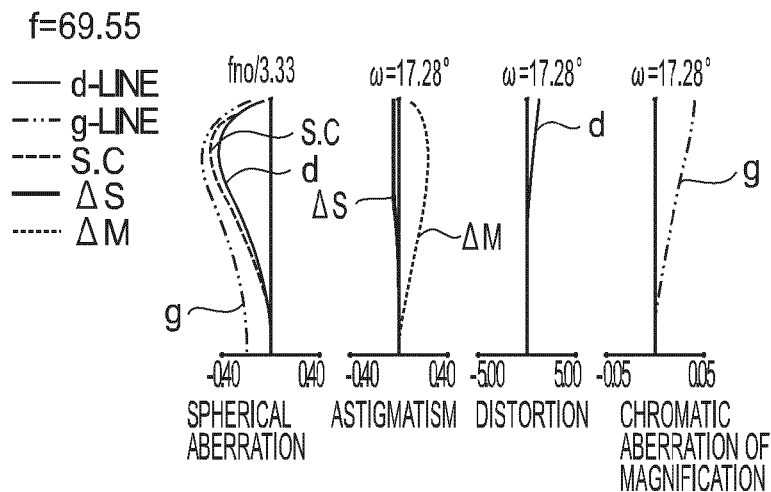
Figure 3A:
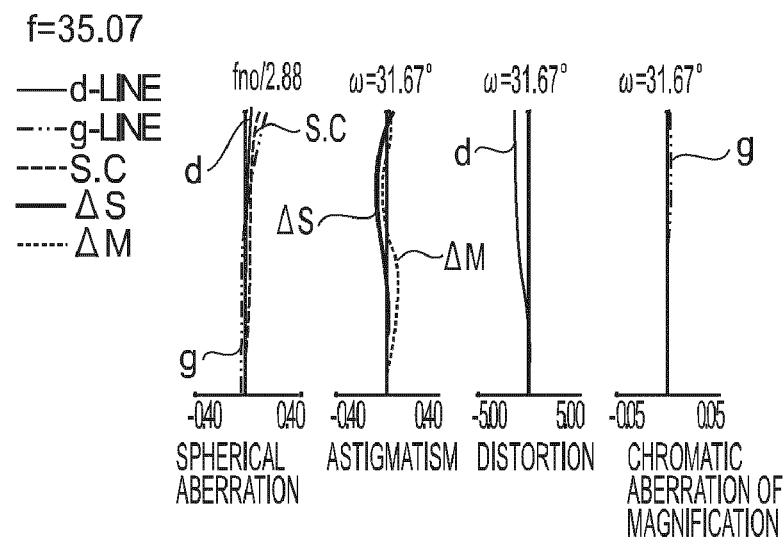
FIGS. 3A, 3B and 3C are aberration diagrams at a wide-angle end, an intermediate focal length and a telephoto end, respectively, when the lens of the first embodiment of the present invention is focused on an object at a shortest photographic distance 0.5 m (β=0.15).
Figure 3B:
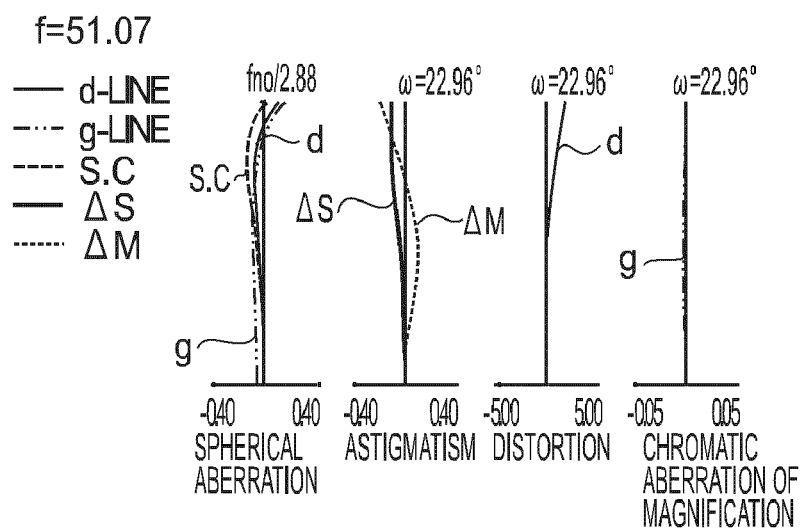
Figure 3C:
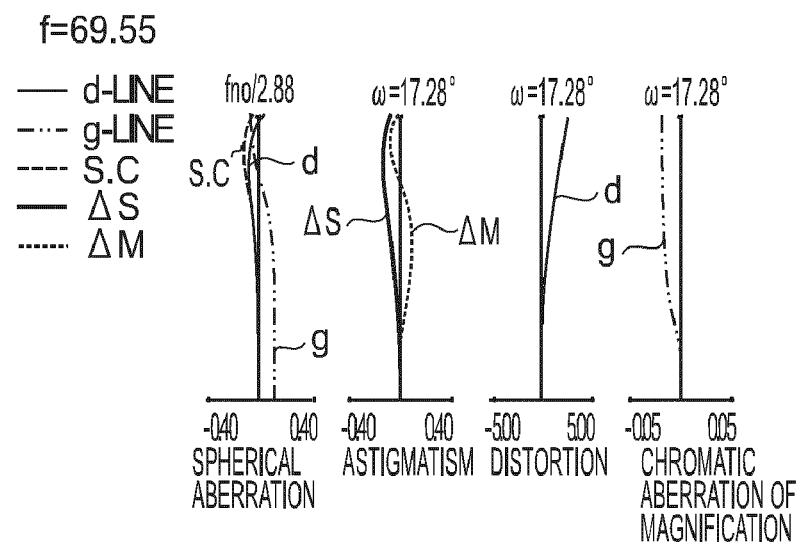
Figure 4A:
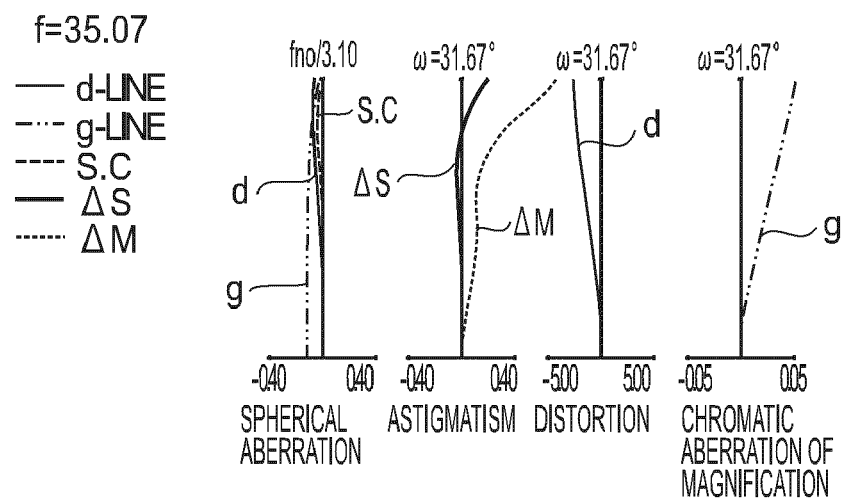
FIGS. 4A, 4B and 4C are aberration diagrams at a wide-angle end, an intermediate focal length and a telephoto end, respectively, when only by a main focusing lens group the lens of the first embodiment of the present invention is focused on an object at a distance 0.5 m (β=0.15).
Figure 4B:
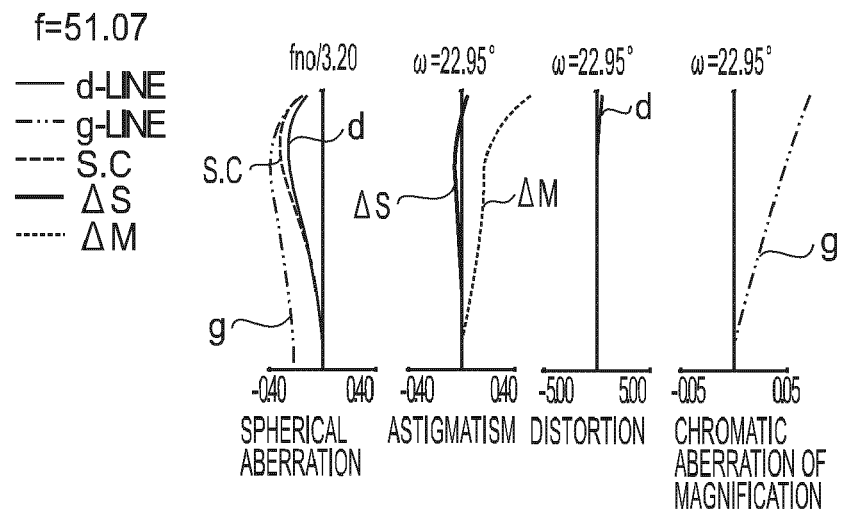
Figure 4C:
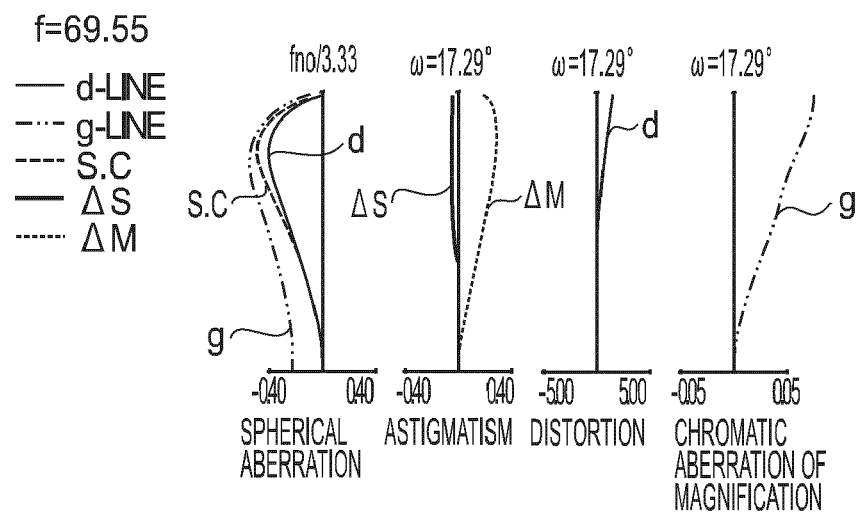
Figure 6A:
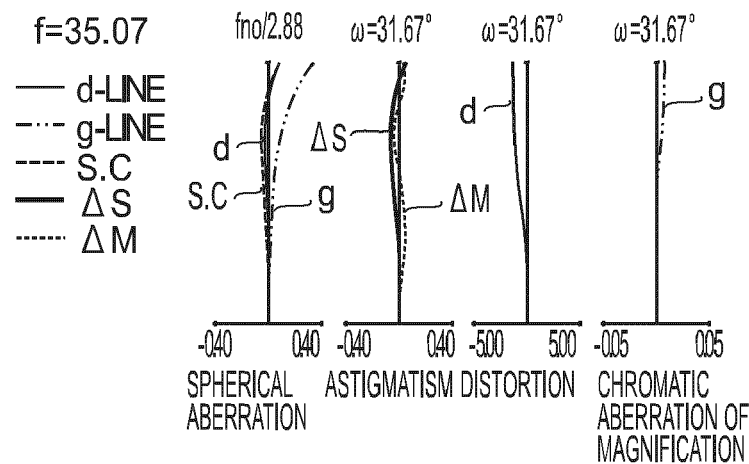
FIGS. 6A, 6B and 6C are aberration diagrams at a wide-angle end, an intermediate focal length and a telephoto end, respectively, when the lens of the second embodiment of the present invention is focused on an object at infinity.
Figure 6B:
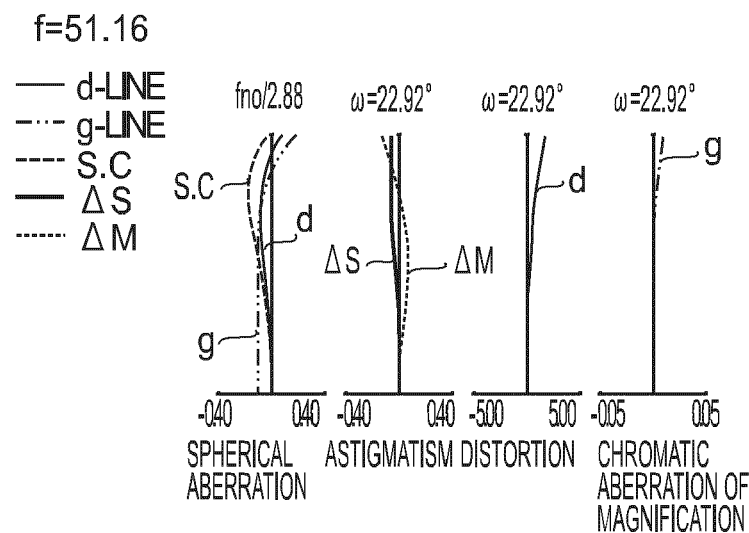
Figure 6C:
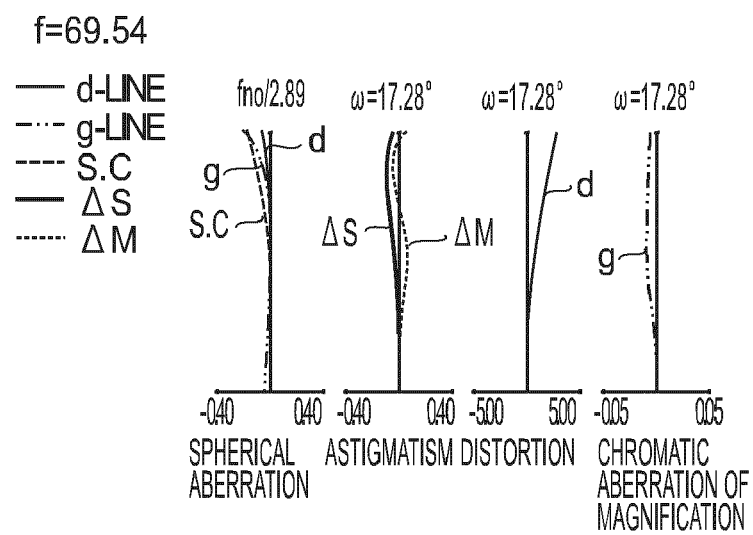
Figure 7A:
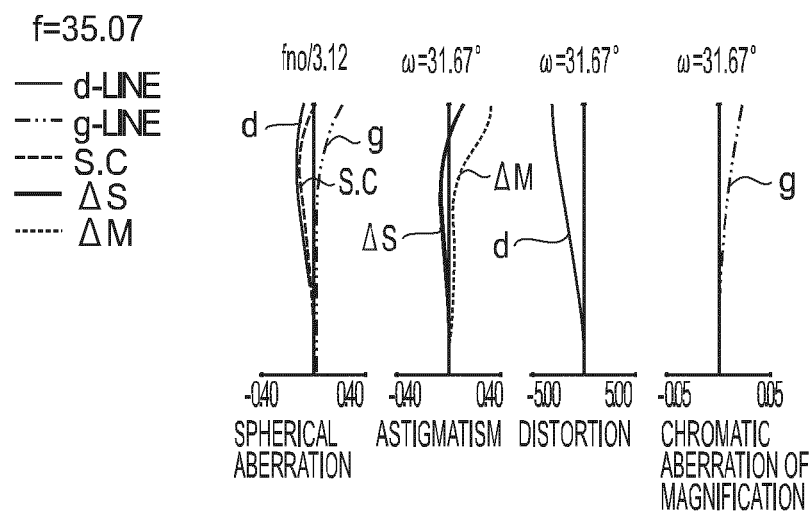
FIGS. 7A, 7B and 7C are aberration diagrams at a wide-angle end, an intermediate focal length and a telephoto end, respectively, when the lens of the second embodiment of the present invention is focused on an object at a shortest photographic distance 0.5 m (β=0.15).
Figure 7B:
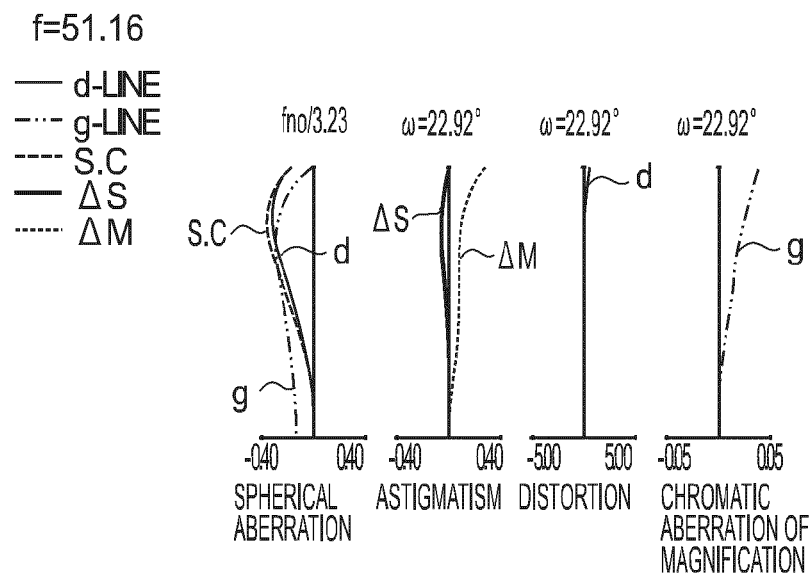
Figure 7C:
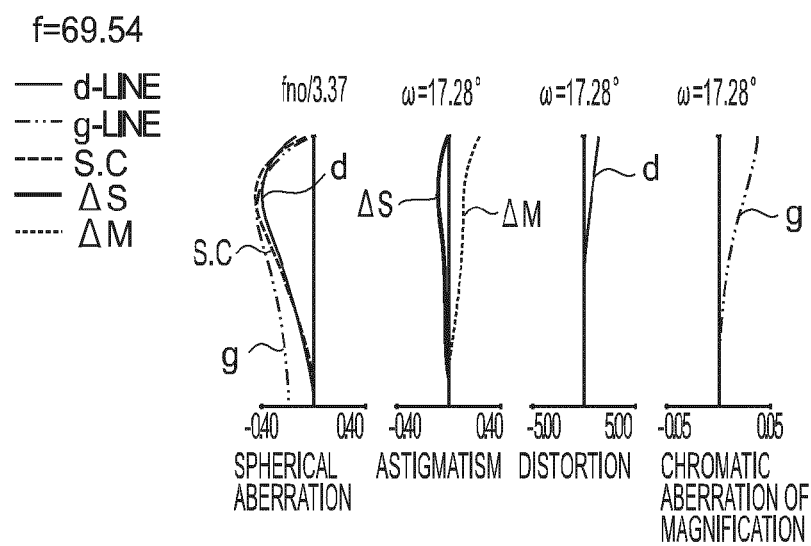
Figure 8A:
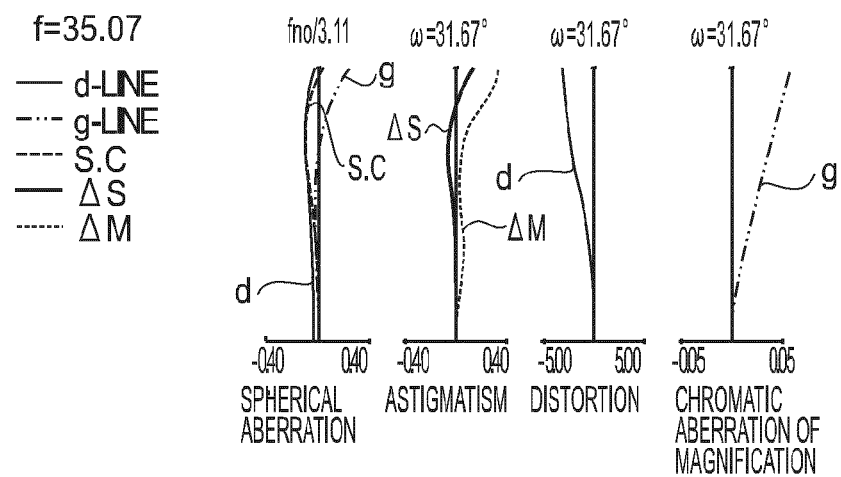
FIGS. 8A, 8B and 8C are aberration diagrams at a wide-angle end, an intermediate focal length and a telephoto end, respectively, when only by a main focusing lens group the lens of the second embodiment of the present invention is focused on an object at a distance 0.5 m (β=0.15).
Figure 8B:
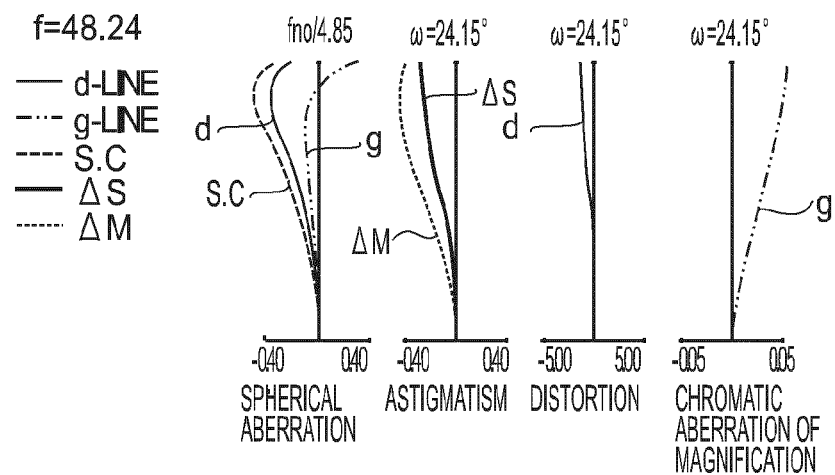
Figure 8C:
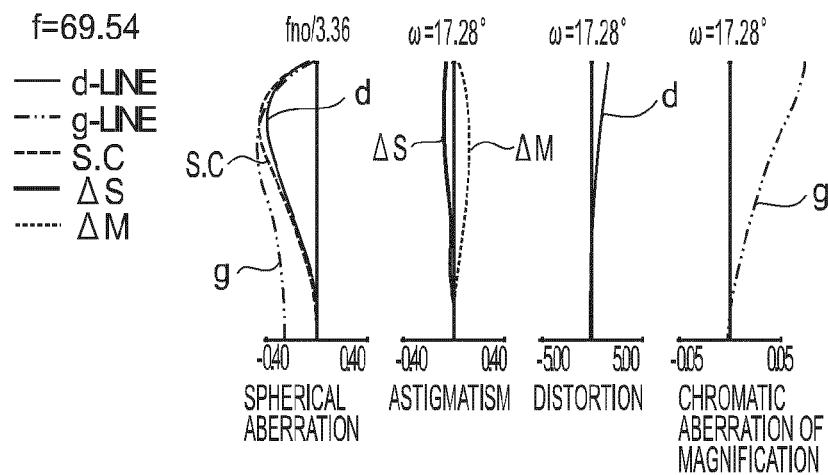
Figure 10A:
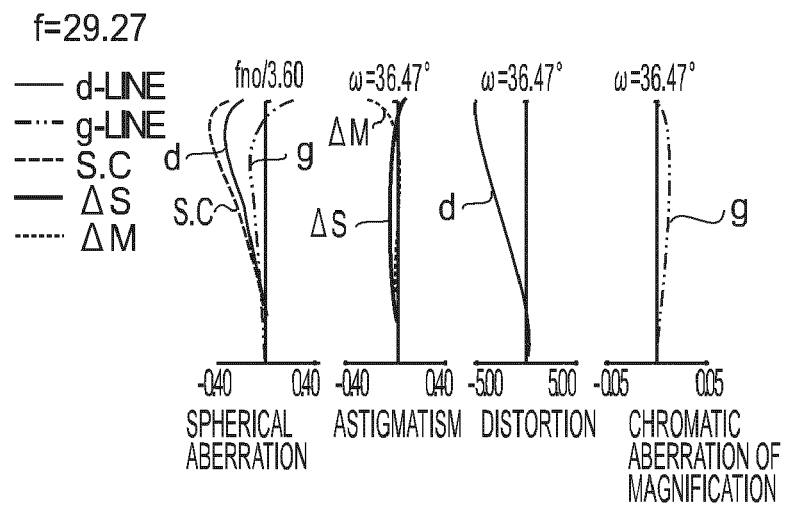
FIGS. 10A, 10B and 10C are aberration diagrams at a wide-angle end, an intermediate focal length and a telephoto end, respectively, when the lens of the third embodiment of the present invention is focused on an object at infinity.
Figure 10B:
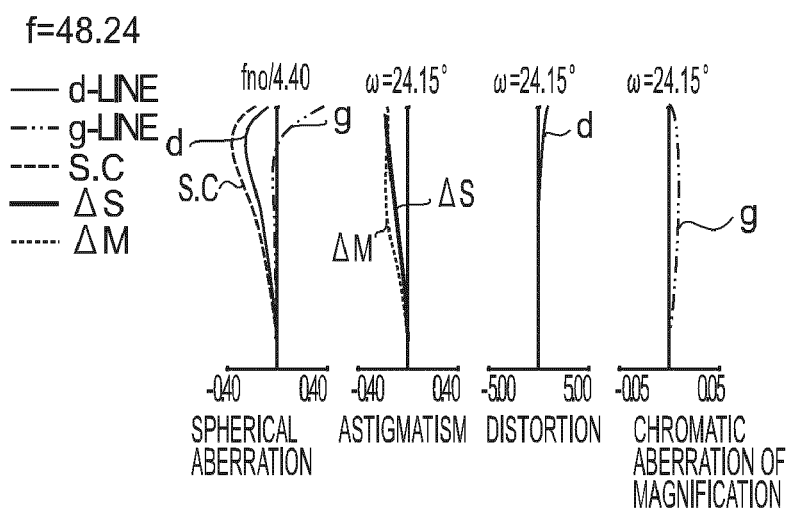
Figure 10C:
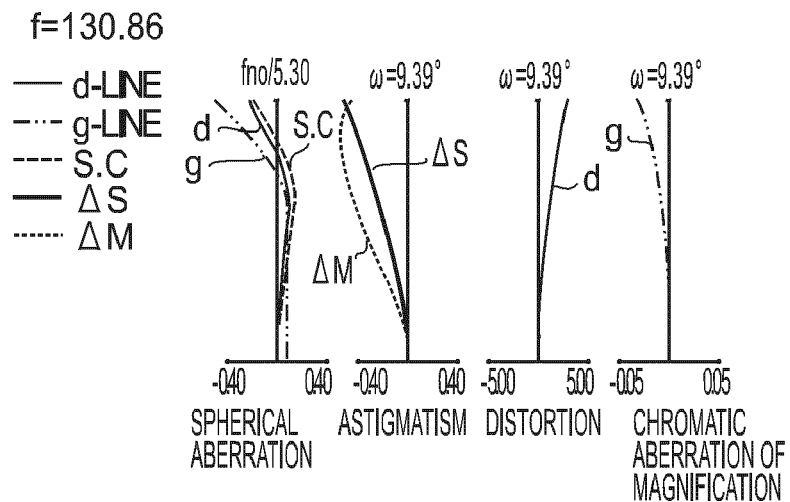
Figure 11A:
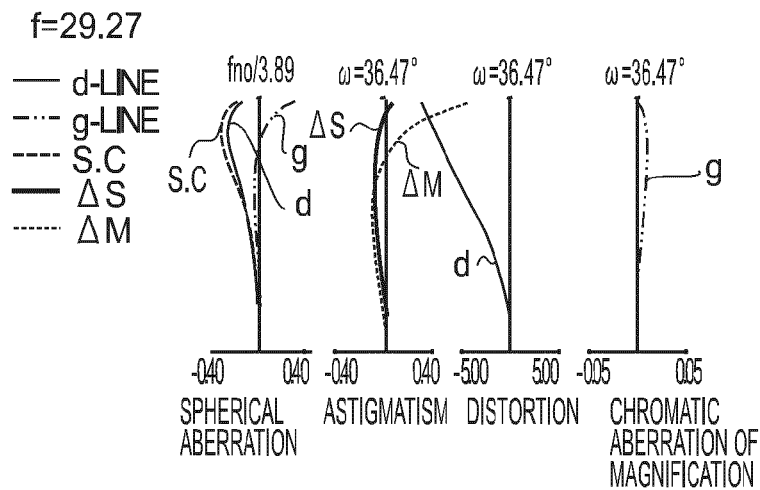
FIGS. 11A, 11B and 11C are aberration diagrams at a wide-angle end, an intermediate focal length and a telephoto end, respectively, when the lens of the third embodiment of the present invention is focused on an object at a shortest photographic distance 0.5 m (β=0.19).
Figure 11B:
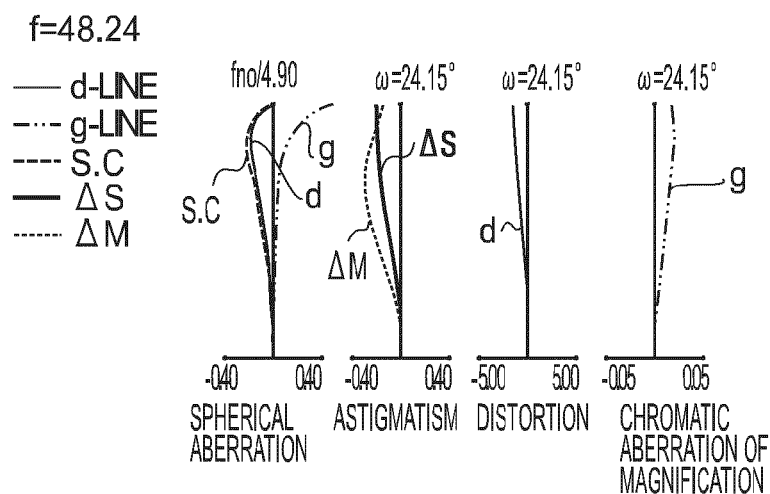
Figure 11C:
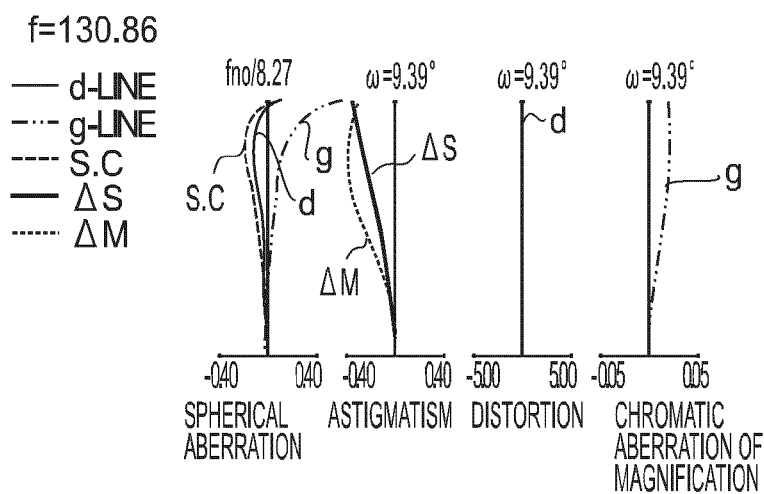
Figure 12A:
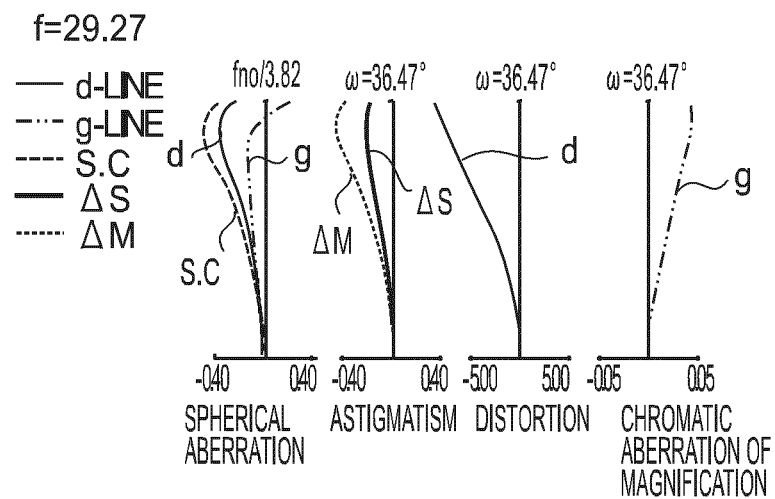
FIGS. 12A, 12B and 12C are aberration diagrams at a wide-angle end, an intermediate focal length and a telephoto end, respectively, when only by a main focusing lens group the lens of the third embodiment of the present invention is focused on an object at a distance 0.5 m (β=0.19).
Figure 12B:
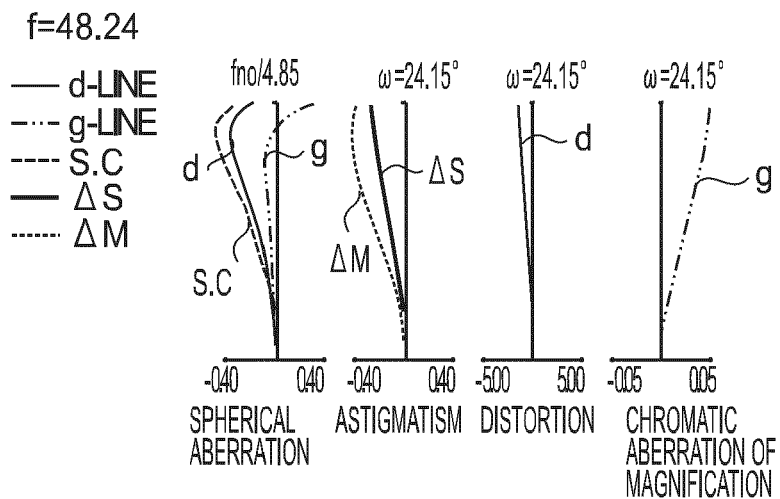
Figure 12C:
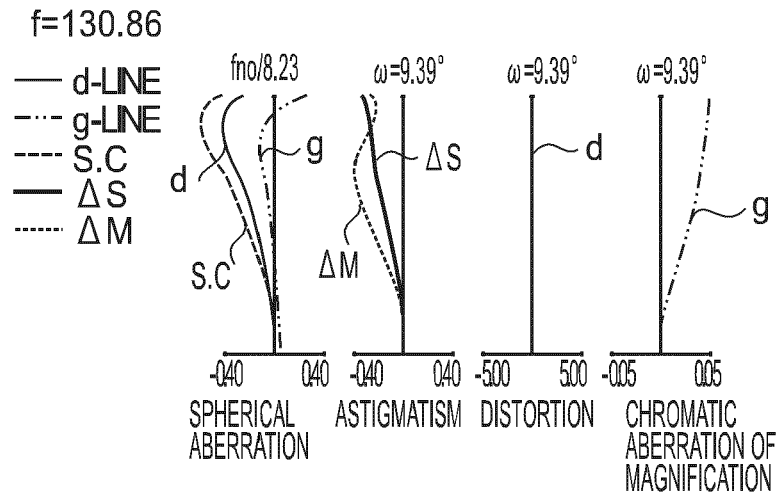
Figure 14A:
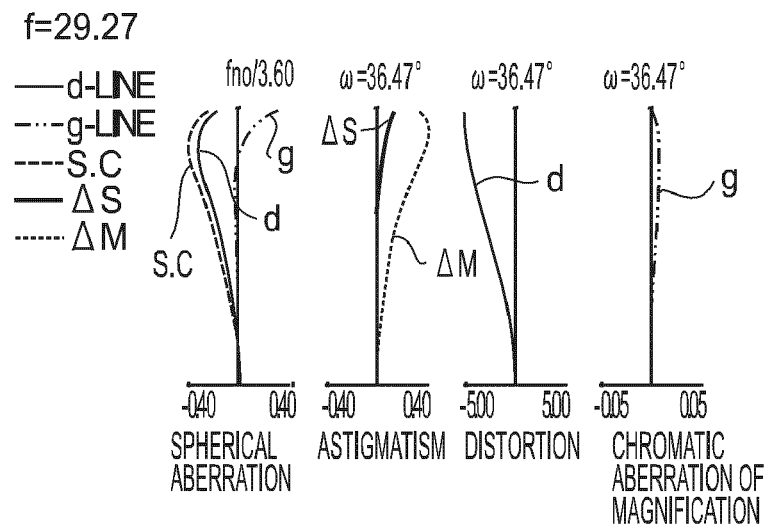
FIGS. 14A, 14B and 14C are aberration diagrams at a wide-angle end, an intermediate focal length and a telephoto end, respectively, when the lens of the fourth embodiment of the present invention is focused on an object at infinity.
Figure 14B:
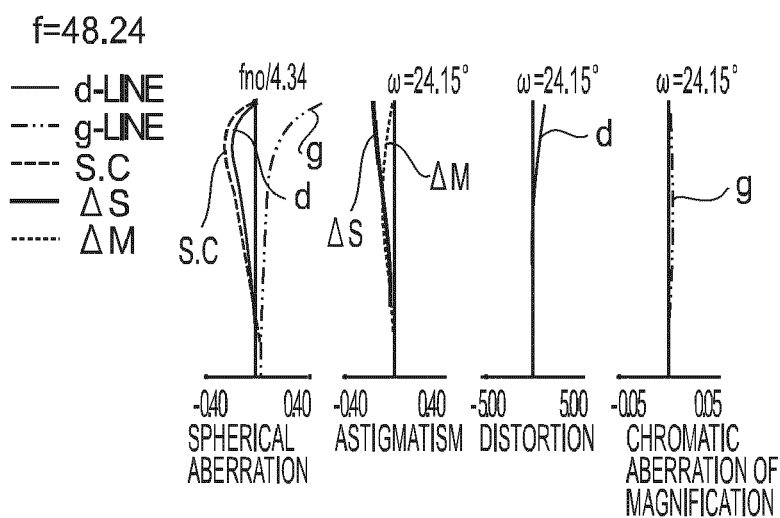
Figure 14C:
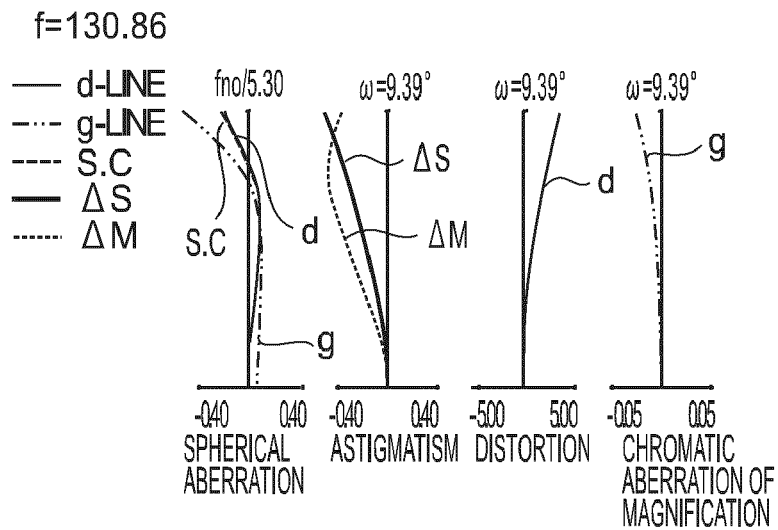
Figure 15A:
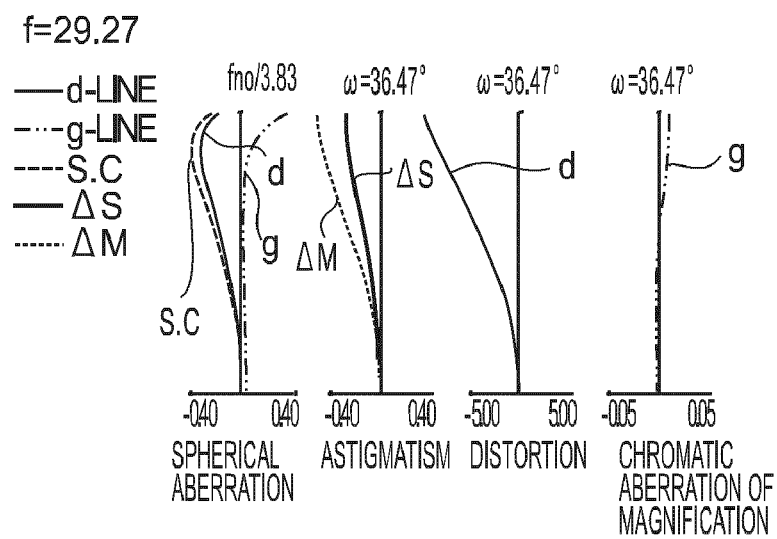
FIGS. 15A, 15B and 15C are aberration diagrams at a wide-angle end, an intermediate focal length and a telephoto end, respectively, when the lens of the fourth embodiment of the present invention is focused on an object at a shortest photographic distance 0.5 m (β=0.20).
Figure 15B:
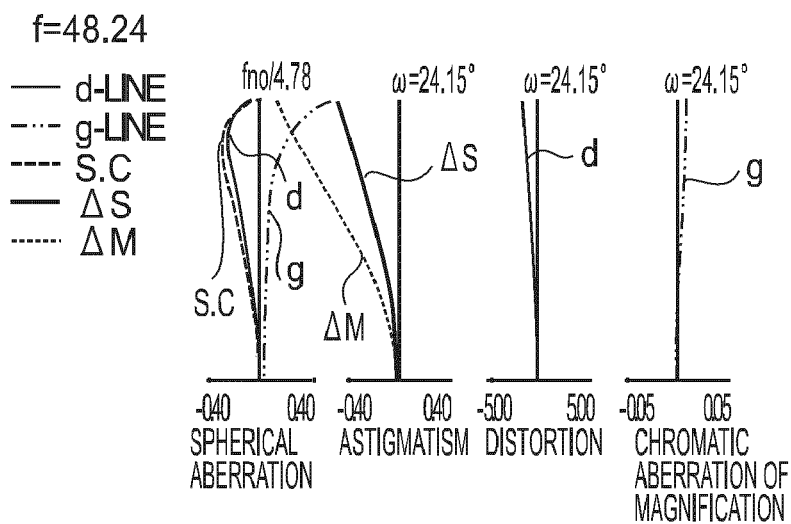
Figure 15C:
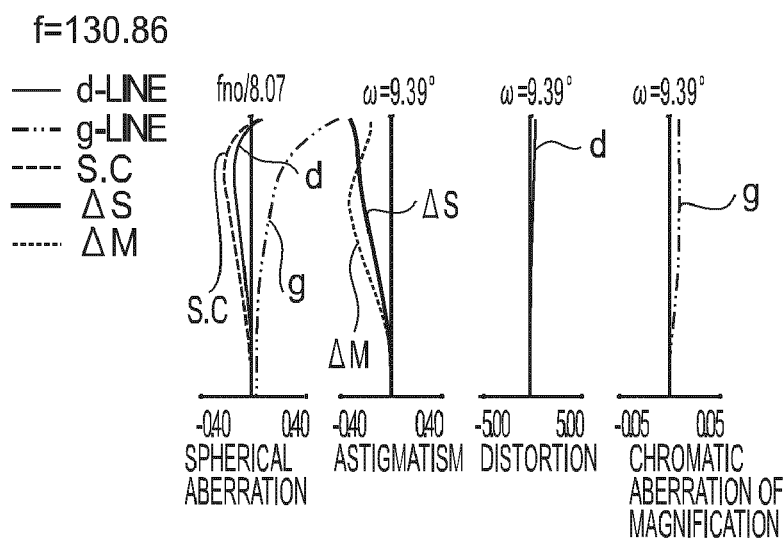
Figure 16A:
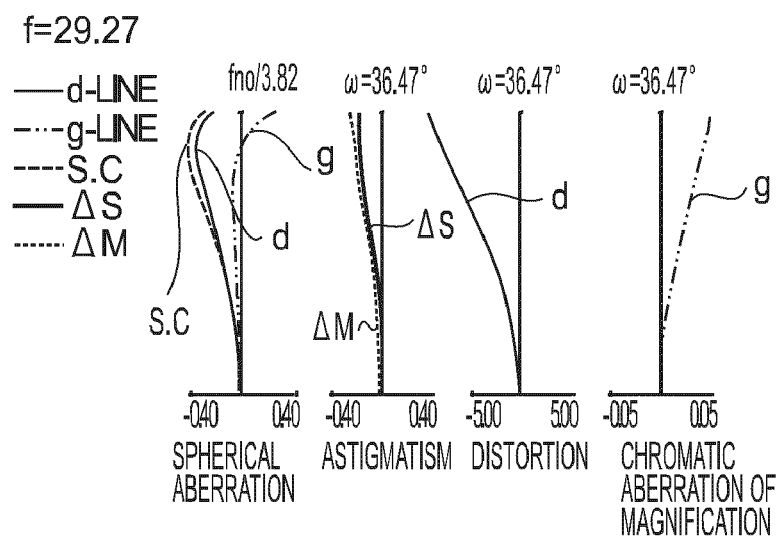
FIGS. 16A, 16B and 16C are aberration diagrams at a wide-angle end, an intermediate focal length and a telephoto end, respectively, when only by a main focusing lens group the lens of the fourth embodiment of the present invention is focused on an object at a distance 0.5 m (β=0.20).
Figure 16B:
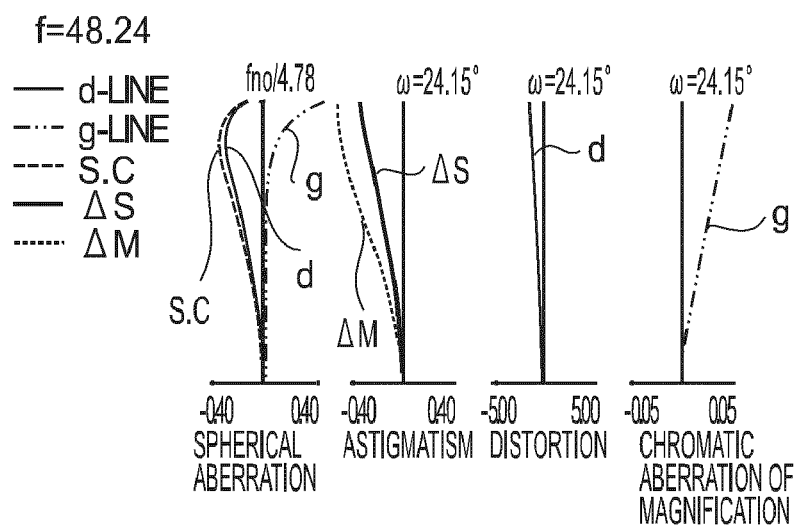
Figure 16C:
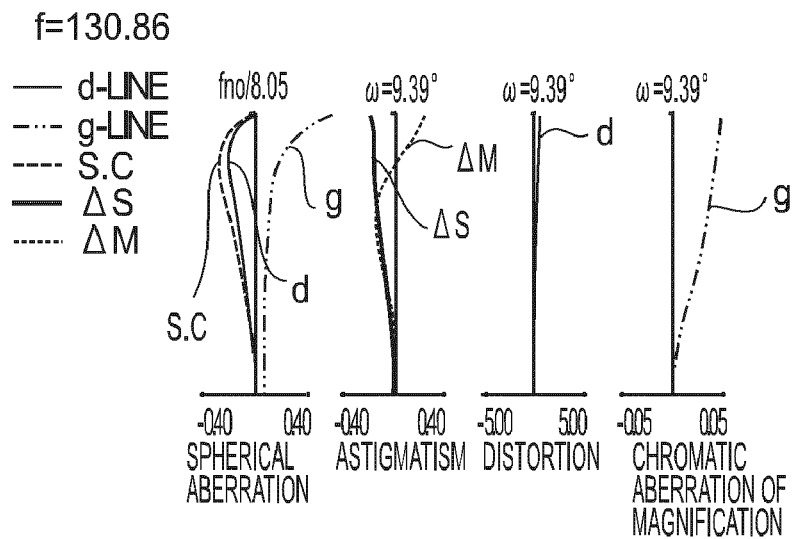

In these diagrams, FIGS. 2A, 3A and 4A (first embodiment), FIGS. 6A, 7A and 8A (second embodiment), FIGS. 10A, 11A and 12A (third embodiment), and FIGS. 14A, 15A and 16A (fourth embodiment) are aberration diagrams at a wide-angle end, respectively. FIGS. 2B, 3B and 4B (first embodiment), FIGS. 6B, 7B and 8B (second embodiment), FIGS. 10B, 11B and 12B (third embodiment), and FIGS. 14B, 15B and 16B (fourth embodiment) are aberration diagrams at an intermediate zoom position, respectively. FIGS. 2C, 3C and 4C (first embodiment), FIGS. 6C, 7C and 8C (second embodiment), FIGS. 10C, 11C and 12C (third embodiment), and FIGS. 14C, 15C and 16C (fourth embodiment) are aberration diagrams at a telephoto end (long focal distance end), respectively.

The distance 0.5 m is the shortest photographic distance of each embodiment, and it is the distance from the image plane. It should be noted that the numerical values of numerical examples to be described later are expressed in terms of the millimeter unit.

Figure 17:
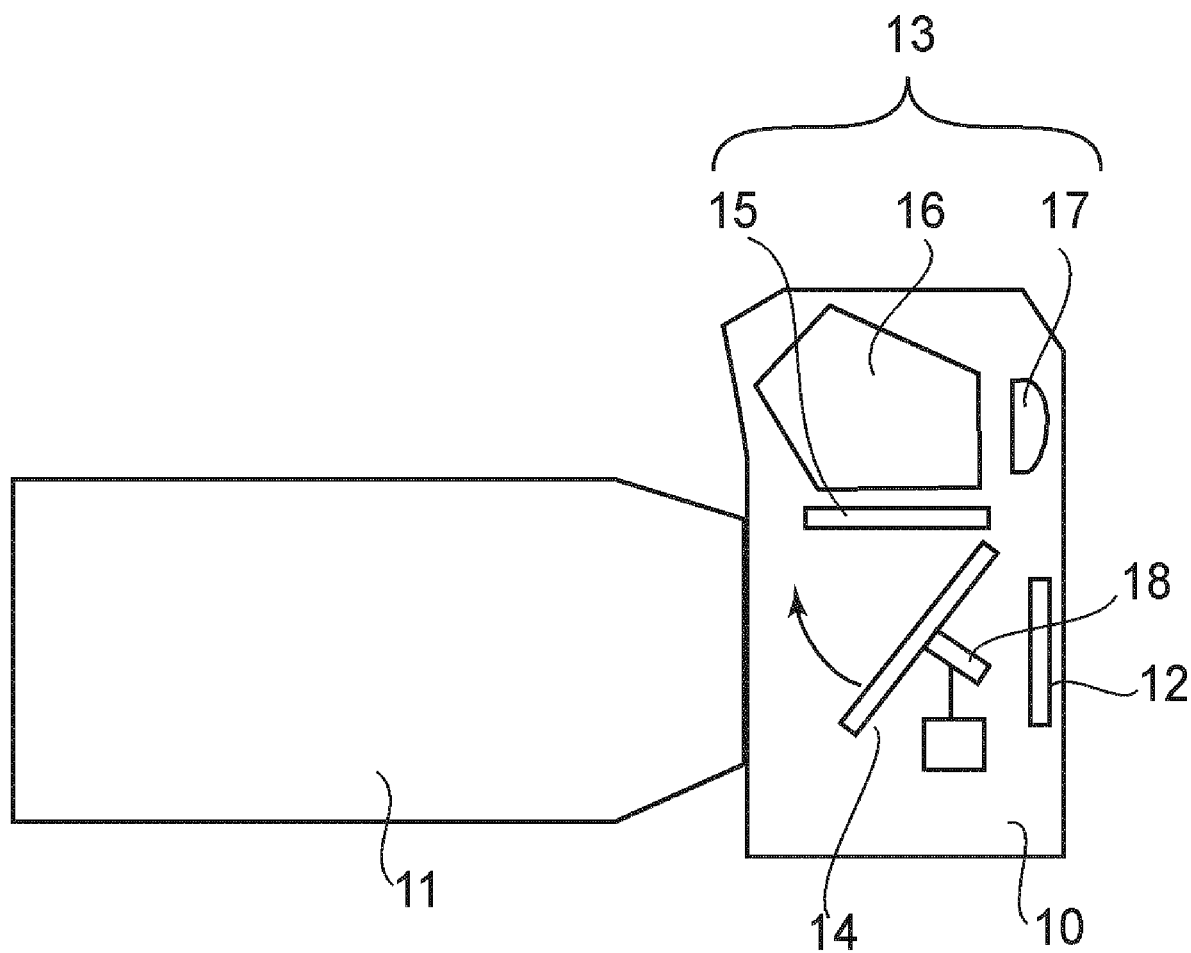
FIG. 17 is a schematic diagram of a main portion of an imaging device according to the present invention.

FIG. 17 is a schematic diagram of a main portion of an imaging device including a zoom lens of the present invention.

In the lens sectional views, the left-hand side corresponds to the object side (photogenic subject side) and the right-hand side corresponds to the image side.

In each lens sectional view, "i" is the order (ordinal number) counted from the object side, and "Li" refers to the "i-th" lens group. Denoted at "LR" is the rear group including one or more lens groups. Denoted at "Lm" is the first focus group, and denoted at "Ls" is the second focus group which is a sub-lens group constituting a portion of one lens group. Denoted at "SP" is an aperture stop.

Denoted at "IP" is the image plane. When the zoom lens is used as a photography optical system of a video camera or a digital still camera, the imaging surface of a solid image pickup device (photoelectric conversion element) such as a CCD sensor or CMOS sensor corresponds to this image plane. If it is used in a silver film camera, the film plane corresponds to this.

Arrows in the diagram show the movement locus of each lens group during the zooming from the wide-angle end to the telephoto end zoom position.

The zoom lens of each embodiment may comprise, in an order from the object side to the image side, a first lens group L1 having a positive refracting power, a second lens group L2 having a negative refracting power, and a rear group LR including two or three lens groups. The zooming may be performed by moving each lens group. Here, it is to be noted that the rear group LR may comprise four or more lens groups.

In each embodiment, the focusing may be carried out by moving two lens groups, that is, a first focus group Lm and a second focus group Ls.

The first focus group Lm (second lens group L2) is such a lens group that the focal plane shifts by a largest amount with the lens group movement.

The second focus group Ls is a sub-lens group constituting a portion of one lens group of the rear group LR which includes a plurality of lens groups after the second lens group L2.

Arrows related to the first focus group Ls and the second focus group Lm denote the locus of movement during the focusing from the infinity to the shortest photographic distance.

In the aberration diagrams, reference characters "d" and "g" denote the d-line and g-line, respectively, and "S.C" denotes the sine condition. Reference characters ΔM and ΔS denote the meridional image plane and the sagittal image plane, respectively. The chromatic aberration of magnification is depicted in terms of the g-line. Reference character "fno" denotes the F number, and "ω" denotes the half field angle.

It is to be noted that, in the embodiments to be described below, the words "wide-angle end" and "telephoto end" are used to refer to the zoom positions when the variable-power lens group is located at each of the opposite ends of the movement range through which the lens group can be mechanically moved along the optical axis.

In each embodiment, both of the first focus group Lm and the second focus group Ls may include a positive lens and a negative lens.

The mean Abbe numbers of the materials of the positive lens and the negative lens, constituting the first focus group Lm, are denoted by "Vmp" and "Vmn", respectively.

The mean Abbe numbers of the materials of the positive lens and the negative lens, constituting the second focus group Ls, are denoted by "Vsp" and "Vsn", respectively.

The difference in the distance from the aperture stop SP to the surface vertex, closest to the object side, of the first focus group Lm when the lens is focused from the infinity to the shortest photographic distance, is denoted by ΔXm (mm).

The difference in the distance from the aperture stop SP to the surface vertex, closest to the object side, of the second focus group Ls when the lens is focused from the infinity to the shortest photographic distance, is denoted by ΔXs (mm).

The focal length of the second focus group Ls is denoted by "fs", and the focal length of the lens group including the second focus group Ls when the lens is focused on an object at infinity is denoted by "ff".

When the focusing from the infinity to the shortest photographic distance is carried out only by use of the first focus group Lm, if the difference in the amount of chromatic aberration of magnification of the g-line is positive, g=1 is assumed. If the difference is negative, g=−1 is assumed.

Furthermore, the movement amount of the second focus group Ls when the lens is focused from the infinity to the shortest photographic distance is denoted by ΔX (mm).

Here, at least one of the following conditions is satisfied.

$$\Delta Xm*(Vmn-Vmp)*\Delta Xs*(Vsn-Vsp)>0 \quad (1)$$

$$0.01<|ff/fs|<0.40 \quad (2)$$

$$g*(Vsn-Vsp)*\Delta X>0 \quad (3)$$

Next, the optical function of the focusing in the zoom lenses according to the respective embodiments will be explained.

In the zoom lens of each embodiment, in order to correct the change of chromatic aberration of magnification during the focusing, the second focus group Ls is moved so as to cancel the chromatic aberration of magnification produced by the first focus group Lm.

Generally, in a zoom lens, if the lens group which performs the focusing has a positive power (refracting power which is equal to a reciprocal of the focal length), the focal length of the whole system changes as follows.

As compared with the focal length of the whole system when it is focused on an object at infinity, the focal length of the whole system when focused on a short-range object becomes longer.

Therefore, when the lens is focused on a short-range object as compared with when focused on an object at infinity, the chromatic aberration of magnification of the g-line occurs at "under" side.

On the other hand, if the lens group which performs the focusing has a negative power, as compared with the focal length of the whole system when it is focused on an object at infinity, the focal length of the whole system when focused on a short-range object becomes shorter. Therefore, when the lens is focused on a short-range object as compared with when focused on an object at infinity, the chromatic aberration of magnification of the g-line occurs at "over" side.

When the first focus group has a negative power and the second focus group has a negative chromatic aberration component of magnification, if the second focus group is located at the object side of the aperture stop, the change of chromatic aberration of magnification can be corrected by moving the same toward a direction leaving away from the aperture stop. On the other hand, if it is at the image side of the aperture stop, the change of chromatic aberration of magnification can be corrected by moving the same toward a direction nearing the aperture stop.

Furthermore, when the first focus group has a negative power and the second focus group has a positive chromatic aberration component of magnification, if the second focus group is located at the object side of the aperture stop, the change of chromatic aberration of magnification can be corrected by moving the same toward a direction nearing the aperture stop.

On the other hand, if it is at the image side of the aperture stop, the change of chromatic aberration of magnification can be corrected by moving the same toward a direction leaving away from the aperture stop.

Furthermore, when the first focus group has a positive power and the second focus group has a positive chromatic aberration component of magnification, if the second focus group is located at the object side of the aperture stop, the change of chromatic aberration of magnification can be corrected by moving the same toward a direction leaving away from an aperture stop.

If it is at the image side of the aperture stop, the change of chromatic aberration of magnification can be corrected by moving the same toward a direction nearing the aperture stop.

Furthermore, when the first focus group has a positive power and the second focus group has a negative chromatic aberration component of magnification, if the second focus group is located at the object side of the aperture stop, the change of chromatic aberration of magnification can be corrected by moving the same toward a direction nearing the aperture stop.

If it is at the image side of the aperture stop, the change of chromatic aberration of magnification can be corrected by moving the same toward a direction leaving away from the aperture stop.

Each of the conditional expressions (1) and (3) mentioned hereinbefore is a conditional expression for correcting the change of chromatic aberration of magnification produced by the first focus group Lm during the focusing, with the second focus group Ls.

If the value lowers beyond the lower limit of conditional expression (1), the first focus group Lm and the second focus group Ls no more move in the direction cancelling the chromatic aberration of magnification. On the other hand, if the value lowers beyond the lower limit of conditional expression (3), the first focus group Lm and second focus group Ls no more move in the direction cancelling the chromatic aberration of magnification.

The second focus group Ls has a function for correcting the change of chromatic aberration of magnification during the focusing. Therefore, if a relatively strong power is assigned to the second focus group Ls, during the focusing the aberration such as spherical aberration or field curvature, for example, may fluctuate. Thus, it becomes difficult to obtain good optical performance throughout the whole zoom region.

Conditional expression (2) specifies that power of the second focus group Ls.

If the power of the second focus group Ls becomes too strong beyond the upper limit of conditional expression (2), the aberration other than the chromatic aberration of magnification such as spherical aberration or field curvature shifts largely with the movement of the second focus group Ls during the focusing.

As a result, it becomes difficult to obtain good optical performance throughout the whole zoom region and the whole focusing region.

On the other hand, if the power of second focus group Ls lowers beyond the lower limit, the power of the lens group including the second focus group Ls has to be shared by certain lens group or groups other than the second focus group Ls.

As a result, it becomes difficult to perform sufficient aberration correction for the lens group including the second focus group Ls, and thus the correction of aberration change during the zooming becomes difficult to achieve.

More preferably, in each embodiment, the numerical value range of conditional expression (2) should be set as follows.

$$0.01 < |f/fs| < 0.35 \quad (2a)$$

The lens group including the second focus group Ls is comprised of a lens group located at the object side of a lens group, of the rear group LR, which is closest to the image plane.

Furthermore, the first focus group Lm is not comprised of the first lens group L1 which is closest to the object plane, but it is comprised of a lens group at the image side of the first lens group L1.

As described hereinbefore, if a lens group closest to the object side is chosen as a focus group, the lens outside diameter has to be made large so as to secure sufficient image-plane circumferential light quantity for the short-range object.

Furthermore, if a lens group closest to the image plane side is chosen as a focus group, similarly the movement region of the focus group has to be secured, and it is necessary to enlarge the lens outside diameter to obtain sufficient image-plane circumferential light quantity. As a result, if the first focus group Lm and the second focus group Ls are provided as a lens group closest to the object side and a lens group closest to the image plane side, respectively, the image-plane circumferential light quantity decreases the most.

In order to avoid this, the lens outside diameter has to be made large, and it causes enlargement of the lens effective diameter.

In consideration of this, in the present embodiment, the first focus group Lm and the second focus group Ls had better be provided by lens groups, other than a lens group closest to the object side and a lens group closest to the image plane side.

Furthermore, if one lens group of the first focus group Lm and the second focus group Ls is provided by a lens group closest to the object side or a lens group closest to the image plane side, the other lens group had better be provided by a lens group other than the lens group closest to the object side or the lens group closest to the image plane side.

In accordance with the embodiments of the present invention as described hereinbefore, a zoom lens by which a change of aberration during the focusing, particularly the change of chromatic aberration of magnification, can be kept small and good optical performance is provided throughout the whole object distance, is accomplished.

Next, the features of the lens structure of the zoom lens in each embodiment will be explained.

The zoom lens of the first embodiment shown in FIG. 1 comprises, in an order from the object side to the image side, a first lens group L1 having a positive refracting power, a second lens group L2 having a negative refracting power, a third lens group L3 having a positive refracting power, a fourth lens group L4 having a negative refracting power, and a fifth lens group L5 having a positive refracting power.

The fourth lens group L4 includes a "4a-th" lens group L4a having a negative refracting power and a "4b-th" lens group L4b having a negative refracting power.

For the zooming from the wide-angle end to the telephoto end, the first lens group L1 moves toward the object side.

The second lens group L2 moves toward the image plane side while increasing the spacing with the first lens group L1.

The third lens group L3 moves toward the object side together with the fifth lens group L5 while decreasing the spacing with the second lens group L2.

The fourth lens group L4 moves toward the image side while increasing the spacing with the third lens group L3.

In the first embodiment, the second lens group L2 constitutes the first focus group Lm and it moves toward the object side for the focusing from the infinity to the shortest photographic distance.

Furthermore, the "4b-th" lens group L4b constitutes the second focus group Ls, and it moves toward the object side for the focusing from the infinity to the shortest photographic distance.

The second focus group Ls is comprised of a single piece of negative lens L4bn and a single piece of positive lens L4bp. A high-dispersion glass material is used as the material of the negative lens L4bn, while a low-dispersion glass material is used as the material of the positive lens L4bp.

The second focus group Ls as a whole has a negative chromatic aberration component of magnification. For the focusing from the infinity to the shortest photographic distance, the second focus group Ls is moved toward the object side. With this arrangement, a change of chromatic aberration of magnification produced by the focusing of the first focus group Lm can be corrected, and good optical performance with the chromatic aberration of magnification being well corrected is accomplished throughout the whole focusing region.

The zoom lens of the second embodiment shown in FIG. 5 comprises, in an order from the object side to the image side, a first lens group L1 having a positive refracting power, a second lens group L2 having a negative refracting power, a third lens group L3 having a positive refracting power, a fourth lens group L4 having a negative refracting power, and a fifth lens group L5 having a positive refracting power.

The fourth lens group L4 includes a "4a-th" lens group L4a having a negative refracting power and a "4b-th" lens group L4b having a negative refracting power.

For the zooming from the wide-angle end to the telephoto end, the first lens group L1 moves toward the object side.

The second lens group L2 moves toward the image plane side while increasing the spacing with the first lens group L1.

The third lens group L3 moves toward the object side together with the fifth lens group L5 while decreasing the spacing with the second lens group L2.

The fourth lens group L4 moves while increasing the spacing with the third lens group L3.

In the second embodiment, the second lens group L2 constitutes the first focus group Lm and it moves toward the object side for the focusing from the infinity to the shortest photographic distance.

Furthermore, the "4b-th" lens group L4b constitutes the second focus group Ls, and it moves toward the image side for the focusing from the infinity to the shortest photographic distance.

The second focus group Ls is comprised of a single piece of negative lens L4bn and a single piece of positive lens L4bp. A low-dispersion glass material is used as the material of the negative lens L4bn, while a high-dispersion glass material is used as the material of the positive lens L4bp.

The second focus group Ls as a whole has a positive chromatic aberration component of magnification.

For the focusing from the infinity to the shortest photographic distance, the second focus group Ls is moved toward the image plane side. With this arrangement, a change of chromatic aberration of magnification produced by the focusing of the first focus group Lm can be corrected, and good optical performance with the chromatic aberration of magnification being well corrected is accomplished throughout the whole focusing region.

The zoom lens of the third embodiment shown in FIG. 9 comprises, in an order from the object side to the image side, a first lens group L1 having a positive refracting power, a second lens group L2 having a negative refracting power, a third lens group L3 having a positive refracting power, and a fourth lens group L4 having a positive refracting power.

The third lens group L3 includes a "3a-th" lens group L3a having a positive refracting power and a "3b-th" lens group L3b having a negative refracting power.

For the zooming from the wide-angle end to the telephoto end, the first lens group L1 moves toward the object side.

The second lens group L2 moves toward the object side while increasing the spacing with the first lens group L1.

The third lens group L3 moves toward the object side while decreasing the spacing with the second lens group L2.

The fourth lens group L4 moves toward the object side while decreasing the spacing with the third lens group L3.

In the third embodiment, the second lens group L2 constitutes the first focus group Lm and it moves toward the object side for the focusing from the infinity to the shortest photographic distance.

Furthermore, the "3b-th" lens group L3b constitutes the second focus group Ls, and it moves toward the object side for the focusing from the infinity to the shortest photographic distance.

The second focus group Ls is comprised of a single piece of negative lens L3bn and a single piece of positive lens L3bp. A high-dispersion glass material is used as the material of the negative lens L3bn, while a low-dispersion glass material is used as the material of the positive lens L3bp.

The second focus group Ls as a whole has a negative chromatic aberration component of magnification. For the focusing from the infinity to the shortest photographic distance, the second focus group Ls is moved toward the object side. With this arrangement, a change of chromatic aberration of magnification produced by the focusing of the first focus group Lm can be corrected, and good optical performance with the chromatic aberration of magnification being well corrected is accomplished throughout the whole focusing region.

The zoom lens of the fourth embodiment shown in FIG. 13 comprises, in an order from the object side to the image side, a first lens group L1 having a positive refracting power, a second lens group L2 having a negative refracting power, a third lens group L3 having a positive refracting power, and a fourth lens group L4 having a positive refracting power.

The third lens group L3 includes a "3a-th" lens group L3a having a positive refracting power and a "3b-th" lens group L3b having a negative refracting power.

For the zooming from the wide-angle end to the telephoto end, the first lens group L1 moves toward the object side.

The second lens group L2 moves while increasing the spacing with the first lens group L1.

The third lens group L3 moves toward the object side while decreasing the spacing with the second lens group L2.

The fourth lens group L4 moves toward the object side while decreasing the spacing with the third lens group L3.

In the fourth embodiment, the second lens group L2 constitutes the first focus group Lm and it moves toward the object side for the focusing from the infinity to the shortest photographic distance.

Furthermore, the "3b-th" lens group L3b constitutes the second focus group Ls, and it moves toward the image side for the focusing from the infinity to the shortest photographic distance.

The second focus group Ls is comprised of a single piece of negative lens L3bn and a single piece of positive lens L3bp. A low-dispersion glass material is used as the material of the negative lens L3bn, while a high-dispersion glass material is used as the material of the positive lens L3bp.

The second focus group Ls as a whole has a positive chromatic aberration component of magnification.

For the focusing from the infinity to the shortest photographic distance, the second focus group Ls is moved toward the image plane side, by which a change of chromatic aberration of magnification produced by the focusing of the first focus group Lm can be corrected. Hence, good optical performance with the chromatic aberration of magnification being well corrected is accomplished throughout the whole focusing region.

In the first to fourth embodiments of the present invention, the movement amount of the second focus group is made constant, regardless of the focal length of the whole lens system. However, the invention is not limited to this. The movement amount of the second focus group may be made variable with the focal length of the whole lens system.

If the movement amount is made variable with the focal length of the whole lens system, the degree of freedom for correction of the change of chromatic aberration of magnification increases, and thus a better performance zoom lens can be accomplished easily.

Numerical examples 1-4 corresponding to the first to fourth embodiments of the present invention will be shown below. In these numerical examples, the reference character "i" denotes the surface number counted in an order from the object side. "Ri" denotes the curvature radius of the i-th surface, and "Di" denotes the spacing between the i-th surface and the "i+1"th surface. "Ni" and "vi" denote the refractive index of the lens material and the Abbe number thereof with respect to the d-line ($\lambda$=587.6 nm).

Reference characters A, B, C, D and E denote the aspherical coefficient. When the point of intersection between the lens surface and the optical axis is taken as an origin and the advancement direction of light is taken as positive, the aspherical surface shape can be represented by the following equation, based on the position X in the optical axis direction and the position Y in a direction perpendicular to the optical axis.

$$x = \frac{(1/R)H^2}{1+\sqrt{1-(H/R)^2}} + AH^2 + BH^4 + CH^6 + DH^8 + EH^{10}$$

wherein R is the paraxial curvature radius.

Furthermore, "e-0X" means "*10-x". Also, "f" refers to the focal length, and "Fno" refers to the F number. "$\omega$" denotes the half field angle. Furthermore, Table 1 below shows the relationship between the above-mentioned conditional expressions and the numerical examples.

NUMERICAL EXAMPLE 1 f=35.07 to 69.55; Fno=2.88; 2$\omega$=63.3 to 34.6

| | R | D | Nd | vd |
|---|---|---|---|---|
| 1 | 490.28341 | 3.04 | 1.84666 | 23.9 |
| 2 | 123.74070 | 8.29 | 1.60311 | 60.6 |
| 3 | −954.21830 | 0.24 | | |
| 4 | 63.10844 | 6.76 | 1.71300 | 53.9 |
| 5 | 112.09599 | (variable) | | |
| 6* | 95.51490 | 2.00 | 1.80400 | 46.6 |
| 7 | 20.61594 | 9.12 | | |
| 8 | −66.54321 | 1.60 | 1.83481 | 42.7 |
| 9 | 61.08195 | 0.24 | | |
| 10 | 41.82334 | 7.57 | 1.83400 | 37.2 |
| 11 | −44.46603 | 2.37 | | |
| 12 | −28.14821 | 1.44 | 1.80400 | 46.6 |
| 13 | −1279.86699 | 2.94 | 1.80518 | 25.4 |
| 14 | −75.68364 | (variable) | | |
| 15 | 47.40352 | 5.45 | 1.58913 | 61.1 |
| 16 | −89.05641 | 1.50 | | |
| 17 | (stop) | 2.00 | | |
| 18* | 52.34078 | 7.89 | 1.58313 | 59.4 |
| 19 | −29.56759 | 2.10 | 1.84666 | 23.9 |
| 20 | −49.27751 | (variable) | | |
| 21 | −77.94245 | 2.45 | 1.84666 | 23.9 |
| 22 | −38.03050 | 1.28 | 1.69680 | 55.5 |
| 23 | 37.52523 | (variable) | | |
| 24 | −50.61456 | 1.92 | 1.84666 | 23.9 |
| 25 | −106.45206 | 2.96 | 1.80400 | 46.6 |
| 26 | −53.71499 | (variable) | | |
| 27* | 910.35226 | 6.04 | 1.49700 | 81.5 |
| 28 | −31.29675 | 0.25 | | |
| 29 | 37.25611 | 10.37 | 1.49700 | 81.5 |
| 30 | −34.41206 | 2.00 | 1.65412 | 39.7 |
| 31 | 50.17749 | | | |

Lens Group Spacing at Magnification Change/Focusing

| f | 35.07 | | 51.07 | | 69.55 | |
|---|---|---|---|---|---|---|
| Object Distance | Infinity | 0.5 m | Infinity | 0.5 m | Infinity | 0.5 m |
| D5 | 6.07 | 2.30 | 25.38 | 20.63 | 42.07 | 36.06 |
| D14 | 19.79 | 23.56189 | 9.30 | 14.05 | 3.00 | 9.01 |
| D20 | 2.00 | 2.00 | 4.81 | 4.81 | 6.22 | 6.22 |
| D23 | 8.50 | 3.50 | 8.50 | 3.50 | 8.50 | 3.50 |
| D26 | 6.22 | 11.22 | 3.41 | 8.41 | 2.00 | 7.00 |

| | A | B | C | D | E |
|---|---|---|---|---|---|
| 6th Surface | 0.00000E+00 | 3.62545E−06 | 1.38556E−09 | −4.84732E−12 | 1.28283E−14 |
| 18th surface | 0.00000E+00 | −5.42597E−06 | −7.14927E−09 | 6.49543E−12 | −2.45408E−14 |
| 27th surface | 0.00000E+00 | −4.10637E−06 | 9.14858E−09 | −3.78175E−11 | 7.62259E−14 |

NUMERICAL EXAMPLE 2 f=35.07 to 69.54; Fno=2.88; 2ω=63.3 to 34.6

| | R | D | Nd | vd |
|---|---|---|---|---|
| 1 | 438.34026 | 3.04 | 1.84666 | 23.9 |
| 2 | 129.36146 | 7.11 | 1.60311 | 60.6 |
| 3 | 5118.03005 | 0.24 | | |
| 4 | 63.29385 | 7.29 | 1.71300 | 53.9 |
| 5 | 121.60118 | (variable) | | |
| 6* | 101.39759 | 2.00 | 1.80400 | 46.6 |
| 7 | 20.34457 | 8.49 | | |
| 8 | −73.11765 | 1.60 | 1.83481 | 42.7 |
| 9 | 63.24341 | 0.24 | | |
| 10 | 40.44074 | 7.63 | 1.83400 | 37.2 |
| 11 | −45.98531 | 2.38 | | |
| 12 | −28.91585 | 1.44 | 1.80400 | 46.6 |
| 13 | 303.21782 | 3.35 | 1.80518 | 25.4 |
| 14 | −79.18958 | (variable) | | |
| 15 | 46.68149 | 5.44 | 1.60311 | 60.6 |

-continued

| | R | D | Nd | vd |
|---|---|---|---|---|
| 16 | −81.11188 | 1.50 | | |
| 17 | (stop) | 2.00 | | |
| 18* | 57.36112 | 7.89 | 1.58913 | 61.1 |
| 19 | −29.10794 | 2.10 | 1.84666 | 23.9 |
| 20 | −49.22506 | (variable) | | |
| 21 | −82.59598 | 1.91 | 1.80400 | 46.6 |
| 22 | −44.56176 | 1.28 | 1.65412 | 39.7 |
| 23 | 37.00583 | (variable) | | |
| 24 | −31.88183 | 1.92 | 1.48749 | 70.2 |
| 25 | −71.92580 | 2.49 | 1.84666 | 23.9 |
| 26 | −42.18896 | (variable) | | |
| 27* | 190.44020 | 5.89 | 1.49700 | 81.5 |
| 28 | −32.64803 | 0.25 | | |
| 29 | 55.16783 | 7.53 | 1.49700 | 81.5 |
| 30 | −32.73903 | 2.00 | 1.65412 | 39.7 |
| 31 | 56.79520 | | | |

Lens Group Spacing at Magnification Change/Focusing

| f | 35.07 | | 51.16 | | 69.54 | |
|---|---|---|---|---|---|---|
| Object Distance | Infinity | 0.5 m | Infinity | 0.5 m | Infinity | 0.5 m |
| D5 | 6.42 | 2.31 | 26.11 | 20.87 | 42.66 | 36.03 |
| D14 | 20.65 | 24.76094 | 9.45 | 14.68 | 2.88 | 9.51 |
| D20 | 2.00 | 2.00 | 9.44 | 9.44 | 5.40 | 5.40 |
| D23 | 3.65 | 8.65 | 3.65 | 8.65 | 3.65 | 8.65 |
| D26 | 9.44 | 4.44 | 6.99 | 1.99 | 6.04 | 1.04 |

| | A | B | C | D | E |
|---|---|---|---|---|---|
| 6th surface | 0.00000E+00 | 3.01143E−06 | 2.10330E−09 | −5.60268E−12 | 1.20587E−14 |
| 18th surface | 0.00000E+00 | −5.67052E−06 | −6.41421E−09 | −2.40698E−12 | −6.70496E−15 |
| 27th surface | 0.00000E+00 | −4.96342E−06 | 7.47689E−09 | −4.02460E−11 | 9.54123E−14 |

NUMERICAL EXAMPLE 3 f=29.27 to 130.86; Fno=3.60 to 5.30; 2ω=72.9 to 18.8

|  | R | D | Nd | vd |
|---|---|---|---|---|
| 1 | 199.75599 | 2.00 | 1.84666 | 23.9 |
| 2 | 70.36364 | 0.14 | | |
| 3 | 68.69384 | 9.87 | 1.65160 | 58.6 |
| 4 | −373.40976 | 0.12 | | |
| 5 | 44.17854 | 6.48 | 1.72916 | 54.7 |
| 6 | 91.61173 | (variable) | | |
| 7* | 101.47360 | 1.20 | 1.77250 | 49.6 |
| 8 | 13.76005 | 5.59 | | |
| 9 | −41.81808 | 1.10 | 1.80400 | 46.6 |
| 10 | 39.64557 | 0.10 | | |
| 11 | 27.01111 | 4.14 | 1.84666 | 23.9 |
| 12 | −59.27088 | 0.83 | | |
| 13 | −32.68367 | 1.10 | 1.83481 | 42.7 |
| 14 | −91.55686 | (variable) | | |
| 15 | (stop) | 1.19 | | |
| 16* | 46.88314 | 1.99 | 1.58313 | 59.4 |
| 17 | 555.90407 | 0.12 | | |
| 18 | 29.24479 | 4.78 | 1.67790 | 55.3 |
| 19 | −18.29035 | 1.15 | 1.83481 | 42.7 |
| 20 | 276.67796 | (variable) | | |
| 21 | −139.95915 | 1.10 | 1.84666 | 23.9 |
| 22 | 193.44518 | 1.56 | 1.72916 | 54.7 |
| 23 | −257.05734 | (variable) | | |
| 24* | 100.67051 | 3.87 | 1.58313 | 59.4 |
| 25 | −23.87112 | 0.17 | | |
| 26 | 43.53859 | 5.12 | 1.57099 | 50.8 |
| 27 | −27.73480 | 1.20 | 1.83481 | 42.7 |
| 28 | 37.92924 | | | |

NUMERICAL EXAMPLE 4 f=27.97 to 130.86; Fno=3.60 to 5.30; 2ω=72.9 to 18.8

|  | R | D | Nd | vd |
|---|---|---|---|---|
| 1 | 206.20081 | 2.00 | 1.84666 | 23.9 |
| 2 | 73.89428 | 0.11 | | |
| 3 | 71.51029 | 9.37 | 1.65160 | 58.6 |
| 4 | −444.45877 | 0.12 | | |
| 5 | 45.87723 | 6.38 | 1.72916 | 54.7 |
| 6 | 95.75310 | (variable) | | |
| 7* | 67.31264 | 1.20 | 1.77250 | 49.6 |
| 8 | 13.66586 | 6.02 | | |
| 9 | −39.47504 | 1.10 | 1.80400 | 46.6 |
| 10 | 46.49466 | 0.10 | | |
| 11 | 27.88114 | 4.10 | 1.84666 | 23.9 |
| 12 | −70.86825 | 0.97 | | |
| 13 | −33.90248 | 1.10 | 1.80400 | 46.6 |
| 14 | −101.29932 | (variable) | | |
| 15 | (stop) | 1.72 | | |
| 16* | 46.49836 | 2.40 | 1.58313 | 59.4 |
| 17 | −288.62071 | 0.12 | | |
| 18 | 26.31790 | 4.52 | 1.57099 | 50.8 |
| 19 | −26.94514 | 1.15 | 1.84666 | 23.9 |
| 20 | 170.02527 | (variable) | | |
| 21 | −191.40703 | 1.10 | 1.65412 | 39.7 |
| 22 | 34.22697 | 2.32 | 1.80518 | 25.4 |
| 23 | 3814.41553 | (variable) | | |
| 24* | 70.77823 | 3.36 | 1.58313 | 59.4 |
| 25 | −24.93662 | 0.17 | | |
| 26 | 46.57030 | 5.76 | 1.57099 | 50.8 |
| 27 | −17.72145 | 1.20 | 1.83481 | 42.7 |
| 28 | 35.78303 | | | |

Lens Group Spacing at Magnification Change/Focusing

| f | 29.27 | | 48.24 | | 130.86 | |
|---|---|---|---|---|---|---|
| Object Distance | Infinity | 0.5 m | Infinity | 0.5 m | Infinity | 0.5 m |
| D6 | 2.82 | 1.05 | 12.38 | 10.04 | 34.61 | 26.59 |
| D14 | 20.61 | 22.38 | 12.97 | 15.31 | 1.99 | 10.01 |
| D20 | 3.88 | 0.88 | 3.88 | 0.88 | 3.88 | 0.88 |
| D23 | 4.85 | 7.85 | 2.84 | 5.84 | 1.19 | 4.19 |

|  | A | B | C | D | E |
|---|---|---|---|---|---|
| 7th surface | 0.00000E+00 | 3.26776E−07 | −9.86408E−09 | 2.32468E−11 | −4.00883E−14 |
| 16th surface | 0.00000E+00 | 2.71079E−06 | −2.37262E−08 | 4.93992E−10 | −2.52239E−12 |
| 24th surface | 0.00000E+00 | −2.51556E−05 | 1.52195E−08 | −2.34928E−10 | 7.54562E−13 |

Lens Group Spacing at Magnification Change/Focusing

| f | 29.27 | | 48.24 | | 130.86 | |
|---|---|---|---|---|---|---|
| Object Distance | Infinity | 0.5 m | Infinity | 0.5 m | Infinity | 0.5 m |
| D6 | 2.76 | 1.00 | 12.65 | 10.16 | 35.57 | 27.45 |
| D14 | 21.81 | 23.57 | 13.88 | 16.36 | 2.54 | 10.66 |
| D20 | 1.03 | 4.03 | 1.03 | 4.03 | 1.03 | 4.03 |
| D23 | 6.99 | 3.99 | 4.82 | 1.82 | 3.50 | 0.50 |

| | A | B | C | D | E |
|---|---|---|---|---|---|
| 7th surface | 0.00000E+00 | −1.74121E−06 | −7.97434E−09 | 1.16338E−11 | −1.74335E−14 |
| 16th surface | 0.00000E+00 | 7.66425E−07 | −2.12221E−08 | 2.56080E−10 | −2.29014E−12 |
| 24th surface | 0.00000E+00 | −2.03889E−05 | 1.47083E−08 | −1.49094E−10 | 1.02903E−12 |

TABLE 1

| | Numerical Example | | | |
|---|---|---|---|---|
| Conditional Expression | 1 | 2 | 3 | 4 |
| (1) $\Delta Xm*(Vmn - Vmp)*\Delta Xs*(Vsn - Vsp)$ | 5981.189 | 13317.338 | 3652.085 | 1783.172 |
| (2) $|ff/fs|$ | 0.027 | 0.030 | 0.227 | 0.064 |
| (3) $g*(Vsn - Vsp)*\Delta X$ | 113.350 | 231.500 | 92.250 | 42.840 |

Next, an embodiment of a single-lens reflex camera system (imaging device) using a zoom lens according to the present invention will be explained with reference to FIG. 17.

In FIG. 17, denoted at 10 is a single-lens reflex camera body, and denoted at 11 is an interchangeable lens which is based on a zoom lens according to the present invention. Denoted at 12 is recording means such as a film or an image pickup device for recording a photogenic subject image (receiving light) to be formed through the interchangeable lens 11.

Denoted at 13 is a finder optical system for observing the photogenic subject image through the interchangeable lens 11. Denoted at 14 is a swinging quick return mirror 14 for switching the recording means 12 and the finder optical system 13 to transfer the photogenic subject image from the interchangeable lens 11.

When the photogenic subject image is to be observed through the finder, the photogenic subject image focused on a focusing board 15 through the quick return mirror 14 is first converted by a pentagonal prism 16 into an erecting image and, then, it is observed through an eyepiece optical system 17 in an enlarged magnification.

At the time of photographing, the quick return mirror 14 rotates in the direction of an arrow, such that the photogenic subject image is focused on the recording means 12 and is recorded thereon. Denoted at 18 is a sub-mirror, and denoted at 19 is a focal-point detecting device.

As described above, when a zoom lens of the present invention is applied to an imaging device such as a single-lens reflex camera interchangeable lens, an imaging device having high optical performance can be accomplished.

Here, it is to be noted that the present invention is similarly applicable also to a camera without a quick return mirror.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2008-037133 filed Feb. 19, 2008, which is hereby incorporated by reference.

What is claimed is:

1. A zoom lens comprising, in an order from an object side to an image side, a first lens group having a positive refracting power, a second lens group having a negative refracting power, and a rear group including at least one lens group, wherein a zooming operation is performed by changing a spacing of the lens groups, wherein said zoom lens includes an aperture stop and, when said second lens group is taken as a first focus group and a sub-lens group constituting a portion of one lens group of said rear group that moves during the zooming operation is taken as a second focus group and another portion of that one lens group does not move during any focusing, each of said first focus group and said second focus group includes a positive lens and a negative lens, and wherein when mean Abbe numbers of materials of the positive lens and the negative lens of said first focus group are denoted by Vmp and Vmn, respectively, mean Abbe numbers of materials of the positive lens and the negative lens of said second focus group are denoted by Vsp and Vsn, respectively, a difference of a distance from said aperture stop to a surface vertex of said first focus group which is closest to the object side as said zoom lens is focused from infinity to a shortest photographic distance is denoted by ΔXm, a difference of a distance from said aperture stop to a surface vertex of said second focus group which is closest to the object side as said zoom lens is focused from infinity to the shortest photographic distance is denoted by ΔXs, a relation $$\Delta Xm*(Vmn-Vmp)*\Delta Xs*(Vsn-Vsp)>0$$

is satisfied.

2. A zoom lens according to claim 1, wherein one lens group of said rear group is a lens group which is located at the object side of a lens group of said rear group which is closest to the image side.

3. A zoom lens according to claim 1, wherein, when a focal length of said second focus group is denoted by fs and a focal length of the lens group having said second focus group as it is focused on an object at infinity is denoted by ff, a relation $$0.01 < |ff/fs| < 0.40$$

is satisfied.

4. A zoom lens according to claim 1, wherein, when said zoom lens is focused from the infinity to the shortest photographic distance only with said first focus group, g=1 is taken where a difference of chromatic aberration of magnification with respect to a g-line is positive while g=−1 is taken where the difference is negative, and when a movement amount of said second focus group as it is focused from infinity to the shortest photographic distance is denoted by ΔX, a relation $$g*(Vsn-Vsp)*\Delta X > 0$$

is satisfied.

5. An imaging device, comprising:
a zoom lens as recited in claim 1; and
a solid image pickup device configured to receive an image formed by said zoom lens.

6. A zoom lens comprising, in an order from an object side to an image side, a first lens group having a positive refracting power, a second lens group having a negative refracting power, and a rear group including at least one lens group,
wherein a zooming operation is performed by changing a spacing of the lens groups,
wherein when said second lens group is taken as a first focus group and a sub-lens group constituting a portion of one lens group of said rear group that moves during the zooming operation is taken as a second focus group and another portion of that one lens group does not move during any focusing, said second focus group includes at least one positive lens and at least one negative lens, and
wherein when mean Abbe numbers of materials of the positive lens and the negative lens of said second focus group are denoted by Vsp and Vsn, respectively, when said zoom lens is focused from infinity to a shortest photographic distance only with said first focus group, g=1 is taken where a difference of chromatic aberration of magnification with respect to a g-line is positive while g=−1 is taken where the difference is negative, and when a movement amount of said second focus group as it is focused from infinity to the shortest photographic distance is denoted by ΔX, a relation $$g*(Vsn-Vsp)*\Delta X > 0$$

is satisfied.

7. A zoom lens according to claim 6, wherein one lens group of said rear group is a lens group which is located at the object side of a lens group of said rear group which is closest to the image side.

8. A zoom lens according to claim 6, wherein, when a focal length of said second focus group is denoted by fs and a focal length of the lens group having said second focus group as it is focused on an object at infinity is denoted by ff, a relation $$0.01 < |ff/fs| < 0.40$$

is satisfied.

9. An imaging device, comprising:
a zoom lens as recited in claim 6; and
a solid image pickup device configured to receive an image formed by said zoom lens.

* * * * *